March 27, 1962  E. L. HARDER  3,027,084
ELECTRIC POWER TRANSMISSION COMPUTER
Filed Dec. 29, 1955  16 Sheets-Sheet 1

WITNESSES
Robert C. Baird
E. H. Oberheim

INVENTOR
Edwin L. Harder.
BY
Paul E. Friedemann
ATTORNEY

| Fig. 8a. | Fig. 8b. | Fig. 8c. | Fig. 8d. |
| Fig. 8e. | Fig. 8f. | Fig. 8g. | Fig. 8h. |

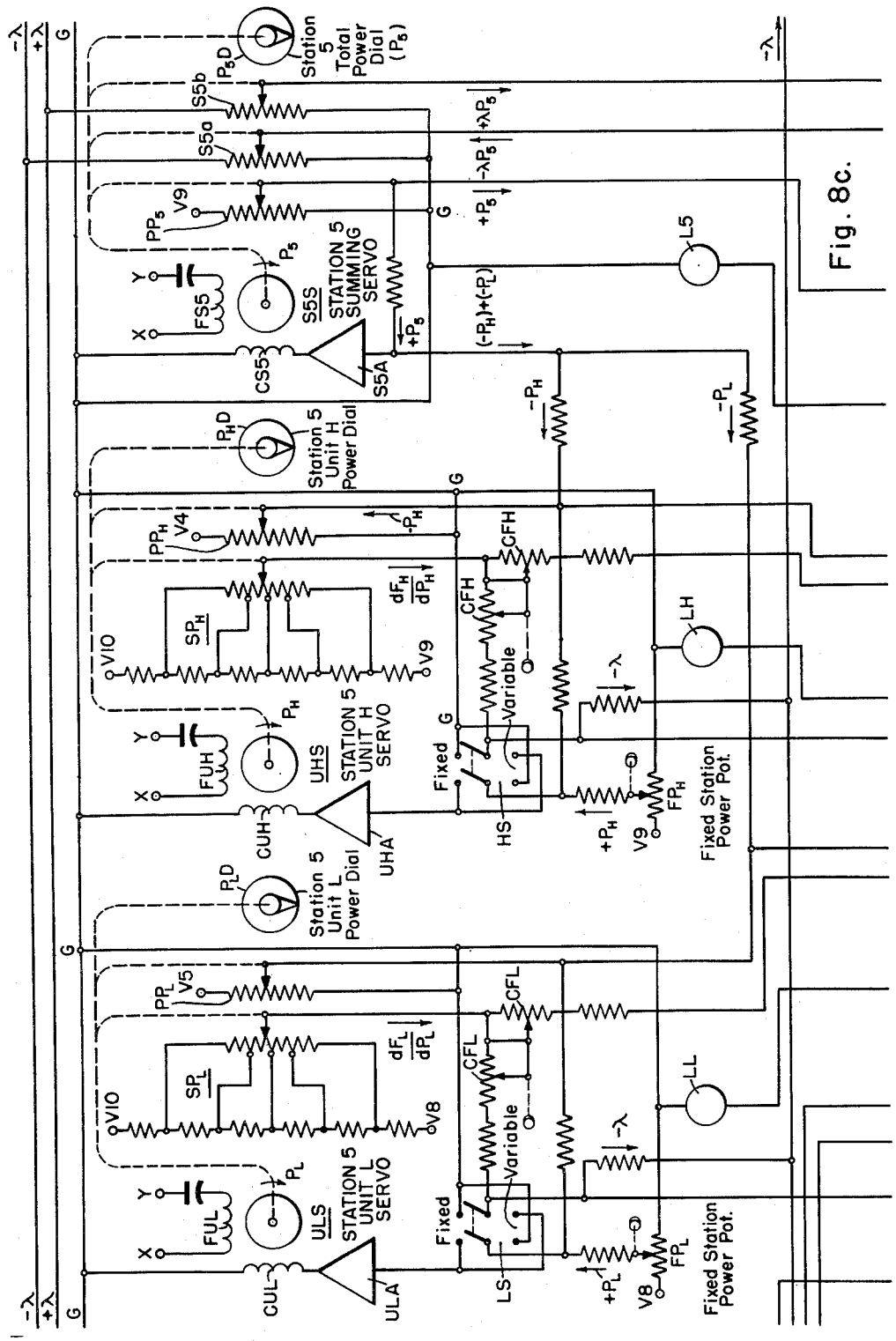

3,027,084
ELECTRIC POWER TRANSMISSION COMPUTER
Edwin L. Harder, Swissvale, Pa., assignor to Westinghouse Electric Corporation, East Pittsburgh, Pa., a corporation of Pennsylvania
Filed Dec. 29, 1955, Ser. No. 556,149
20 Claims. (Cl. 235—185)

This invention relates generally to computers and more particularly to an analogue type of computer adapted to solve sets of simultaneous equations.

Computers of this type are useful in determining the economic dispatch of electric power in electric power transmission systems. Briefly, such systems include a plurality of interconnected electric power generating stations forming the basic system electrical network, having connections to the various loads supplied by the system and frequently having tie line connections with adjoining electric power transmission systems providing for the interchange of electric power between the systems.

The various generating stations are usually geographically situated adjacent areas having heavier electric power demands to minimize power line losses in transmitting large blocks of power and, depending upon the power loading in a given area, one or more stations may be required primarily to serve a particular area within the system, or, alternatively, one or more generators in a given station may be required to operate at some fixed high loading in order to provide minimum power service protection for the area. Since such a system may cover an area of several thousand square miles, the generating stations and tie line interconnections may be widely scattered. Additionally, with reference to steam-electric generating stations, the stations are usually located in areas of differing fuel cost which, coupled with differing thermal efficiencies of these stations, results in varying power incremental production costs among the stations. These factors, plus the incremental cost of power losses in transmission lines in delivering a block of power to a particular point in the transmission system, represent the important considerations in determining the incremental cost of delivered power at the given point with respect to any one or more of the system stations which may be required to furnish the power.

In an interconnected electric power system, as long as load is less than available generation, some choice exists in the matter of how much of the load should be provided by each generating station or how much should be purchased from or sold to adjoining power companies over interconnecting lines. This decision is made by the system dispatcher, usually on economic grounds. This has always been an objective on every power system but requires some knowledge of incremental delivered power costs at each power delivery point in the system with respect to each generating station in the system.

The main factors involved in the determination of incremental delivered power cost are station incremental power production cost and the incremental cost of transmission line power losses. Station incremental generation costs are readily determined from fuel cost and other known station costs. However, the determination of incremental transmission line losses with a network of lines presents a more formidable problem, the complexity of which has discouraged sufficiently frequent ascertainment of losses with changes in power loading to result in accurate loss data. Usually the economic dispatch has been based on station cost alone or station cost with only approximations of the transmission losses.

Since it is convenient to express station cost as a function of generated power, it is desirable to define the transmission losses in terms of the amount of power generated at each station, so that the incremental cost of the losses associated with a particular station may be directly combined with the incremental power production cost to determine the incremental cost of delivered power for that station for any point in the power system. Thus, a plurality of simultaneous equations may be evolved, one for each station or power point, defining the incremental delivered power costs for the respective stations for any power delivery point in the system. The general principle is as follows: The cost of fuel input to a system to supply a given load is minimum when the incremental delivered power cost is the same for every variable station. Variable station means any station which is not operating at either its upper or lower generation limit. The incremental delivered power cost includes the incremental power production cost at the generating station plus the incremental cost of transmission losses. These equations state that the incremental delivered power costs are the same for every variable station and are called the economic dispatch equations. Their solution indicates the amount of power that must be generated by each variable station which, with the fixed powers in tie lines or interconnections and at stations operating at fixed limits, meets the total power requirement of the system. These equations may be solved a sufficient number of times for different values of load, ranging from light to heavy, and the resulting solution plotted to show the correct dispatch for every value of system load.

Such a family of economic dispatch curves must be based on fixed quantities. Specific values for the fuel costs, availability of generating units, dispatch of power in the tie lines, and certain other considerations must be chosen. Consequently, a considerable number of curves must be plotted for different conditions or means must be available for modifying them. Usually new curves must be made every six months, or earlier, to reflect changing fuel cost or system conditions. Although the savings resulting from this graphic determination of economic dispatch are considerable, the work involved in keeping the curves up-to-date and the problems confronting the dispatcher in selecting the proper curves, coupled with the possibility of error in interpreting the curves, are strong inducements favoring the use of a computer capable of determining the correct dispatch for a given system load.

Accordingly, it is one object of this invention to provide a computer capable of solving sets of simultaneous equations of the character referred to.

More specifically, it is an object of this invention to provide a computer capable of determining the economic dispatch of an electric power transmission system.

Still more specifically, it is an object of this invention to provide an analogue type of economic dispatch computer comprising respective computing sections corresponding to the respective generating stations of an electric power transmission system, providing for the term by term representation of the respective incremental station production costs and the respective incremental costs of transmission line power losses and the incremental delivered power cost, and further providing for the simultaneous solution of the equations relating the corresponding terms to determine the power generation requirements at all variable stations for economic power dispatching.

The utility of a computer in a particular application depends also upon its ability to handle conditions which may be subject to change. With regard to steam-electric generating stations, for example, fuel costs may vary from time to time. This changes the incremental production cost but does not change the input-output characteristic or the efficiency curve of the station. This cost change must be reflected in the computer operation if the correct economic dispatch is to be obtained. In simple one boiler stations, with the temporary loss of a fan or a mill, it can be assumed that only the maximum output is changed, not the shape of the efficiency curve. However, in more complicated stations it is necessary to have several basic curves, one for each combination of equipment. As an example, in one station having three boilers feeding a header which supplies two turbines, four combinations of equipment are possible, each having efficiency characteristics differing from the other, the combinations are: one turbine and one boiler, one turbine and two boilers, two turbines and two boilers and all equipment on. Four cost curves are required to represent this condition.

Accordingly, it is also an object of this invention to provide a computer of the character referred to, wherein circuit arrangements are provided to simulate the non-linear cost curves of the respective stations.

Further to the preceding object, it is an object hereof to provide for recalibrating the said circuit arrangements of the computer which simulated the non-linear cost curves of the respective stations, in dependence of variations in station fuel cost, or more generally, generation costs, from a base case or reference value.

Also it is an object of this invention to provide a computer of the character referred to, wherein circuit arrangements are provided for selectively simulating a plurality of different cost curves for the respective generating stations as required.

When there are stations having still more complicated steam electric generating units, for example, low pressure and high pressure steam arrangements having incompatible input-output characteristics, it becomes necessary to represent the station in sections, each section having several cost curves, as referred to above. With a possible choice of $n$ curves for each station, a station represented in two sections has $n^2$ possible operating combinations, considering all equipment to be on.

In this connection, it is an object of this invention to provide an economic dispatch computer wherein provision is made for separately computing the economic dispatch of the respective generating units of a station.

More particularly, with respect to the preceding object, it is an object hereof to provide circuit arrangements for separately simulating the non-linear cost curves of respective generating units of a station to obtain respective determinations of incremental production costs applicable in computing the economic dispatch of the power generated in the respective generating units.

It is also an object hereof to provide separate computer means for representing respective generating units in a station having differing efficiency characteristics wherein each computer means has separate limits corresponding to upper and lower generating limits for the respective generating units.

Power system losses can be roughly divided into two categories, fixed and variable. For the transmission system the transformer exciting losses represent the principal fixed loss, whereas losses in the series resistance of transmission lines and transformers are variable with load current. These are the $I^2R$ losses. Only variable losses are of interest in economic dispatch. As pointed out above, station cost is a function of generated power. Therefore, the cost of the transmission losses must always be expressed in terms of power to obtain consistent systems of units for use in the economic dispatch equations. This expression of the losses in terms of power includes both generated power and power interchanged at ties with other systems, whereby the incremental costs of transmission losses are conveniently combined with the incremental station production costs. This necessitates a suitable set of assumptions so that given the power at each power point, that is, each station and tie, the current in every transmission line is fixed and, therefore, losses are fixed.

The expression of losses in terms of power for any part of the distribution network involves determining the self and mutual drop coefficients for the terms of the power loss expression for the system. This is covered in detail in "Loss Evaluation-II Current and Power-Form Loss Formulas," by E. L. Harder, R. W. Ferguson, W. A. Jacobs and D. C. Harker, AIEE 54–67, 1954, with particular reference to the power-form loss formula derivation. This loss formula is discussed at a later point in this application but only to the extent that its significance in the economic dispatch equations may be appreciated. In general, the terms of the loss formula are derived for a base case, that is, a typical generation, tie power and load flow condition for the system from which the equivalent load center is determined, and with respect to which the self and mutual drop coefficients (the B coefficients as referred to hereinafter) are evaluated and the terms of the loss formula developed. In general, the loss formula includes a power square term for each power point in the system, that is, each generator or tie on the system and a cross product power term for each pair of power points, with the corresponding B coefficients. The B coefficients may be visualized as the self and mutual resistances between the various power points and the equivalent load center of the system as modified by the station bus voltages and outputs and tie powers.

In an average power system, the number of stations and ties is such that a large number of power loss terms must be developed. For example, in one system studied, 400 loss terms were required. In the computer this requires means for producing the electrical equivalents for 400 B coefficients. This can result in substantial complication in the circuitry of the computer if not properly handled.

In regard to the foregoing, it is an object of this invention to provide computer circuit arrangements for simply producing the electrical equivalents of the B coefficients referred to hereinafter.

Further in this regard, it is an object hereof to provide a computer circuit arrangement for producing the electrical equivalents of the B coefficients, wherein provision is made for simply changing the existing B coefficient electrical values as determined for a base case and for adding others to accommodate changes in the system from the base condition, such as the addition of a transmission line or lines.

It is also an object of this invention to provide computer circuit arrangements involving the production of the electrical equivalents of the B coefficients, wherein such arrangements are utilized to produce the respective terms of the formulas defining the incremental cost of transmission line power loss.

Further separate and combined objects of this invention are to provide a computer which is simple to operate, which indicates to the dispatcher total system generation for which a particular economic dispatch is computed, which indicates the economic dispatch of power for each variable station, which indicates the cost of power at any station, which provides for convenient simulation of fixed power in ties and fixed power stations and which provides an indication of the worth of power at any system tie.

The foregoing statements are merely illustrative of the various aims and objects of this invention. Other objects and advantages will become apparent from a study of the following specification when considered in conjunction with the accompanying drawings, in which.

Figure 1:
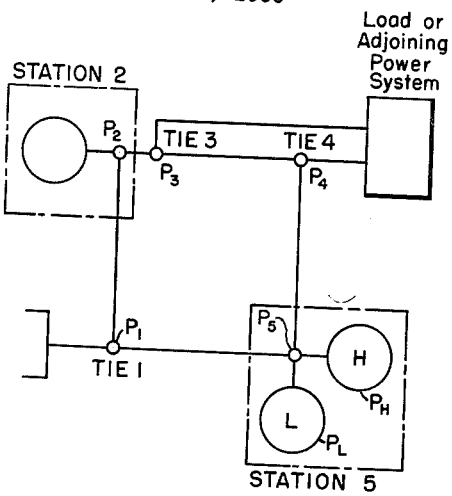
FIGURE 1 is a diagrammatic illustration of a fictitious power system embodying typical power system stations and ties which are to be represented in a computer.
Figure 3:
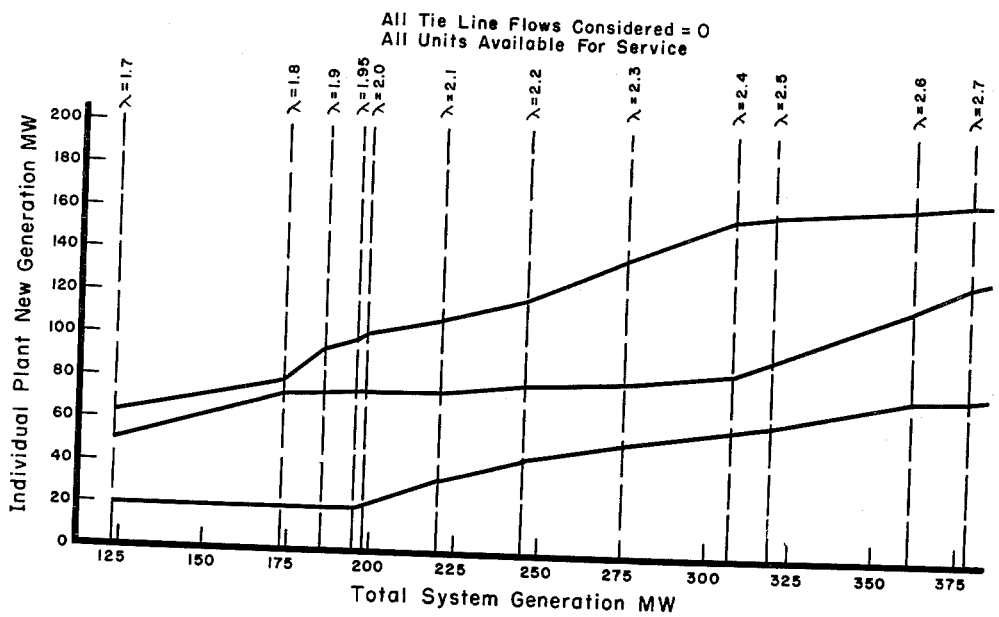
Figure 4:
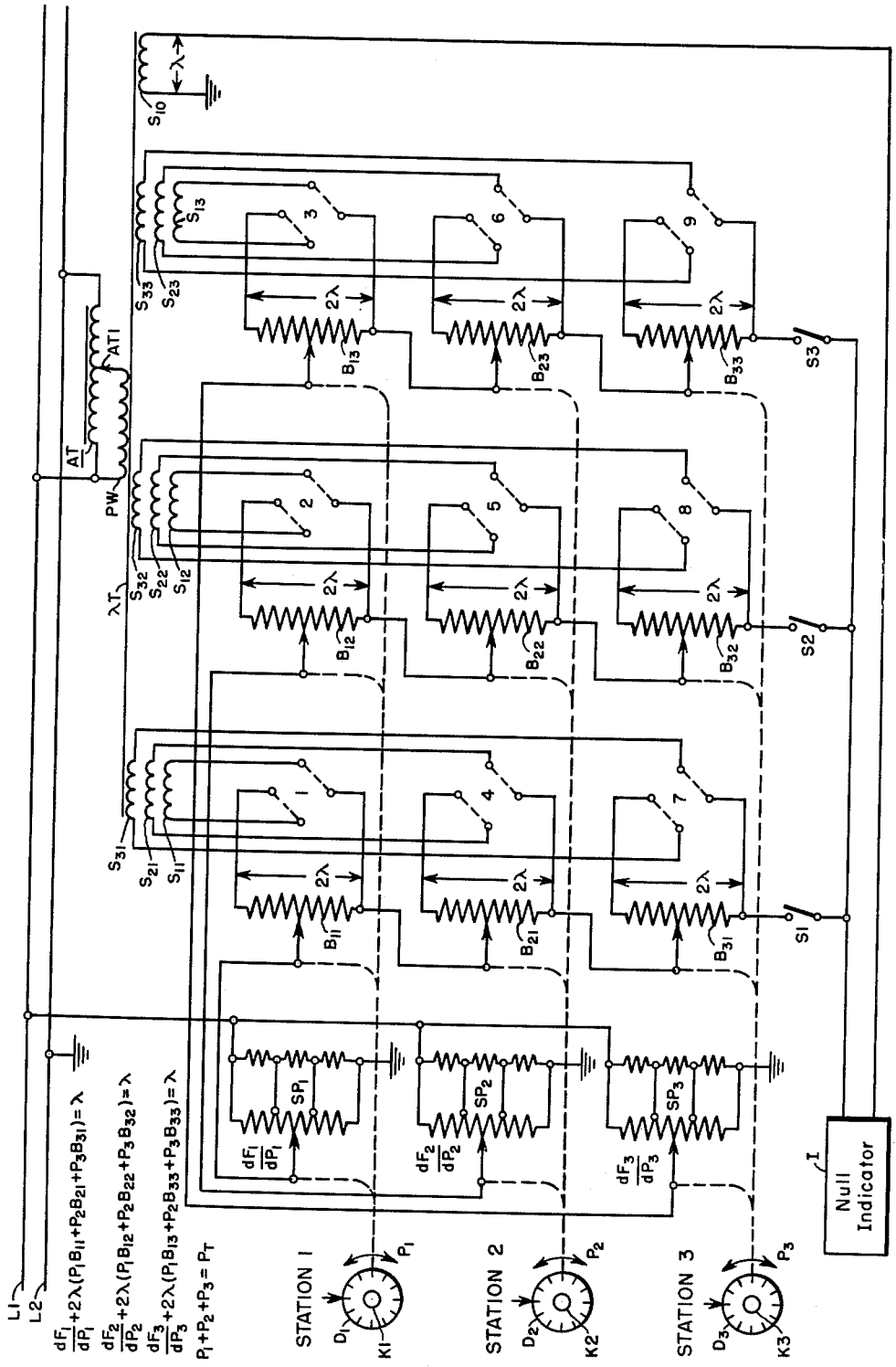
Figure 5:
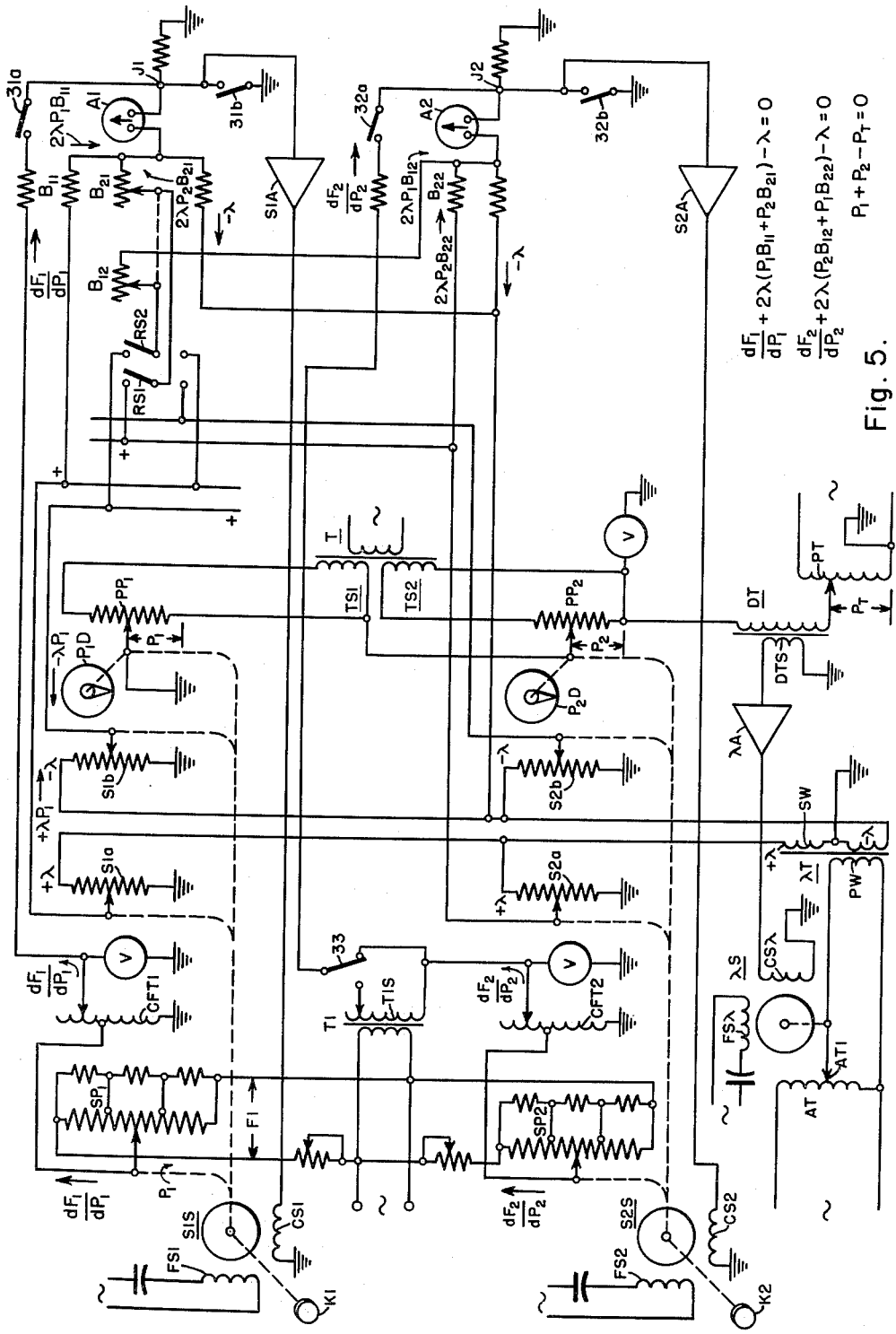
Figures 6, 7:
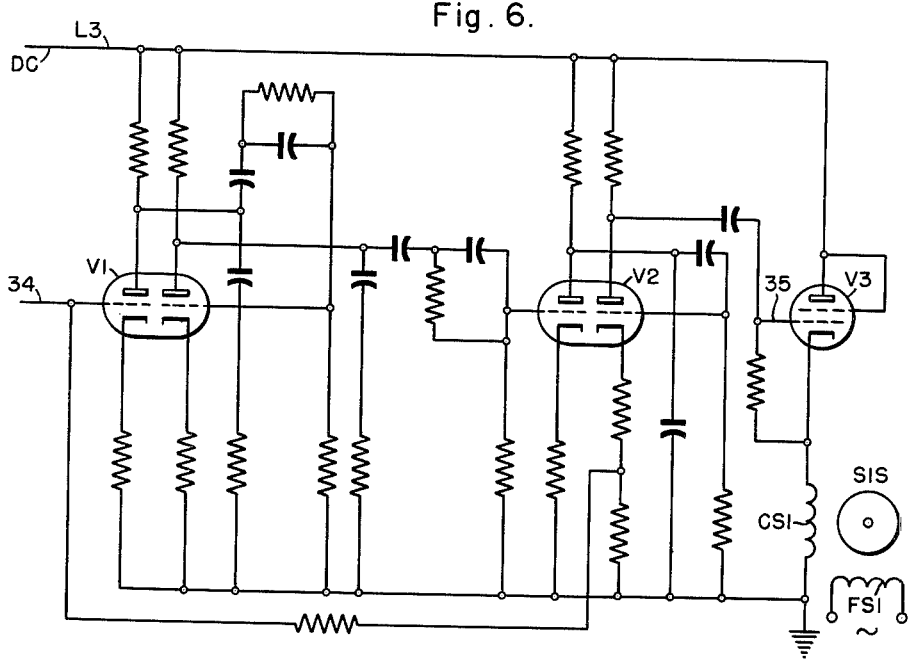
Figure 8A:
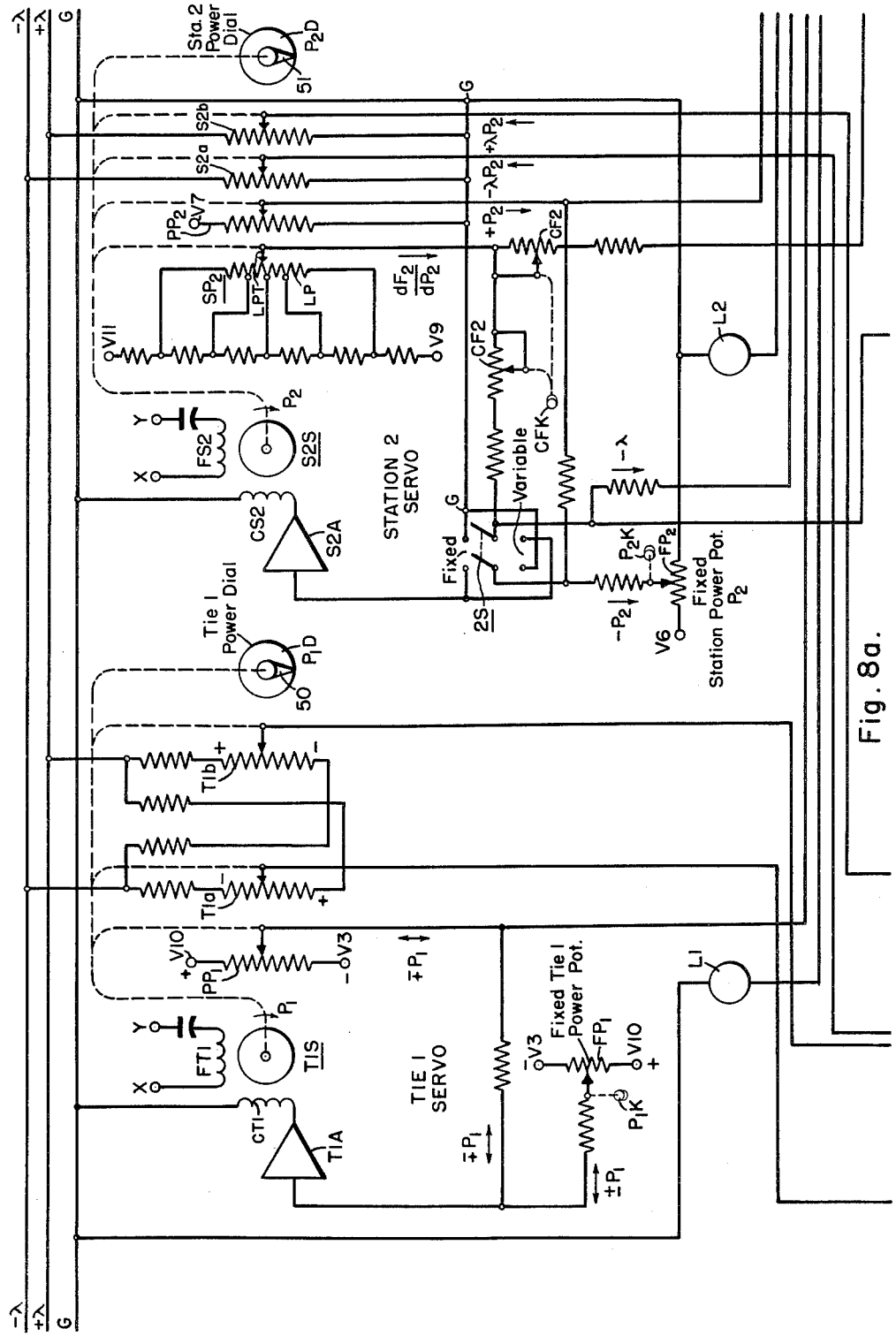
Figure 8B:
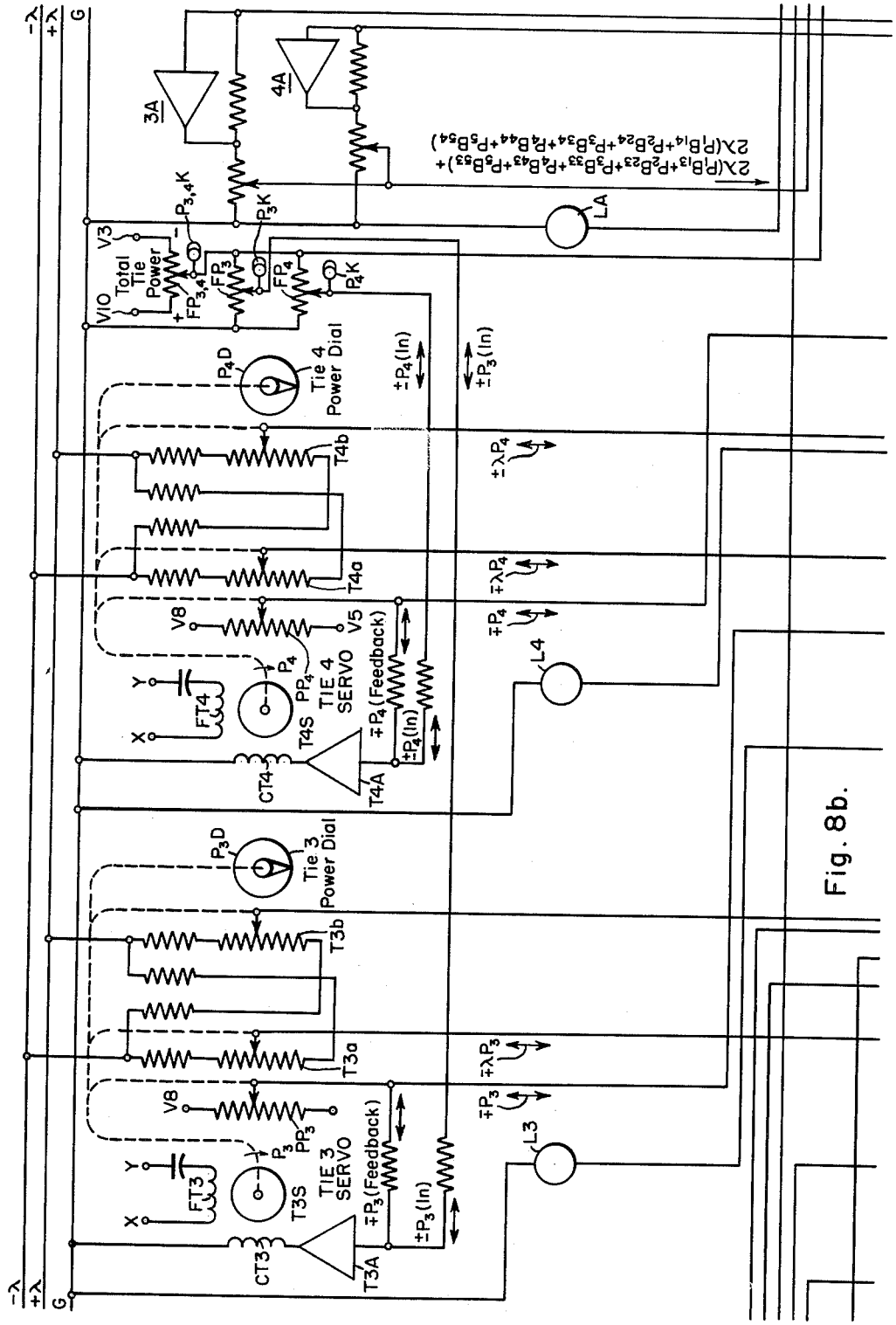
Figure 8D:
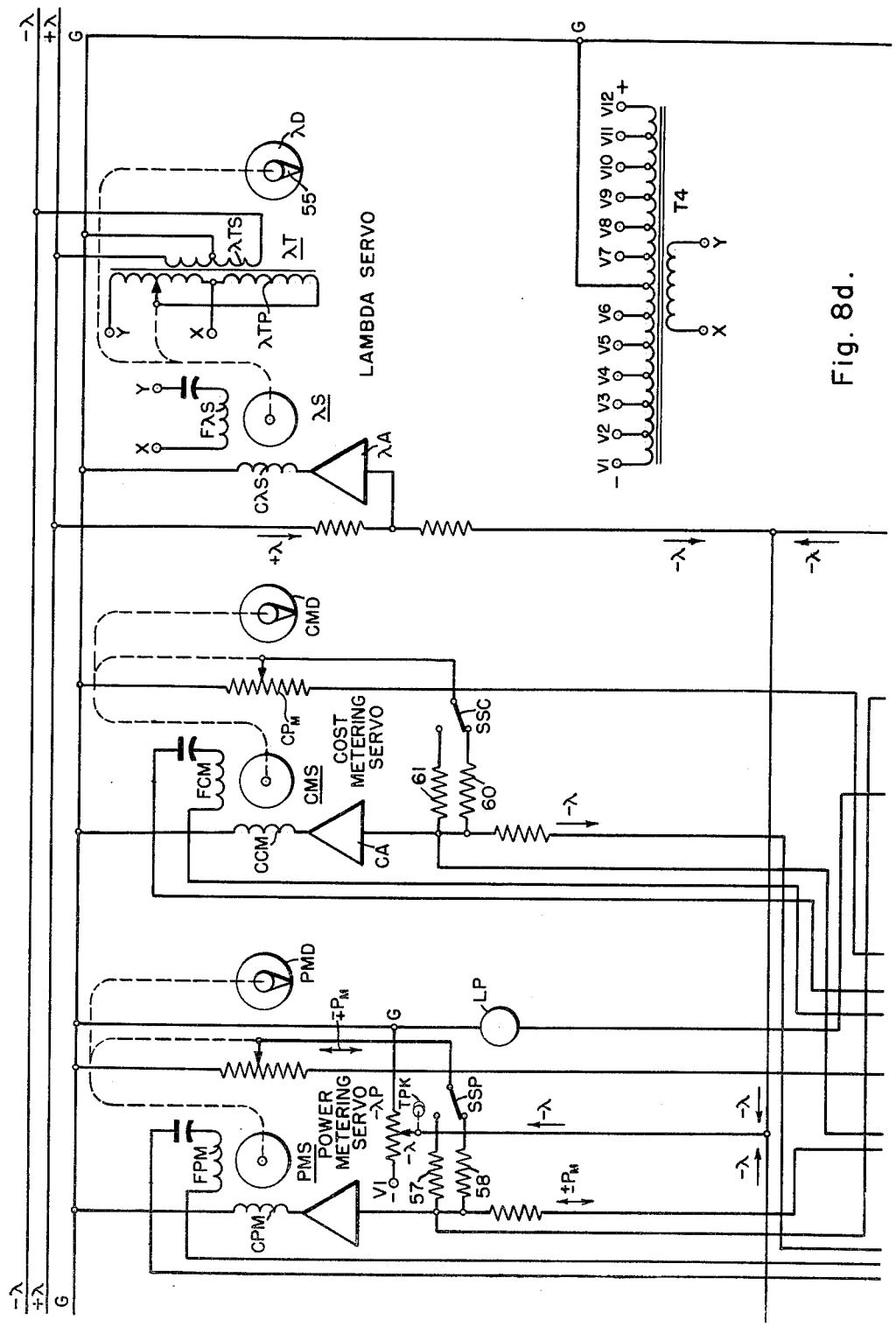
Figure 8E:
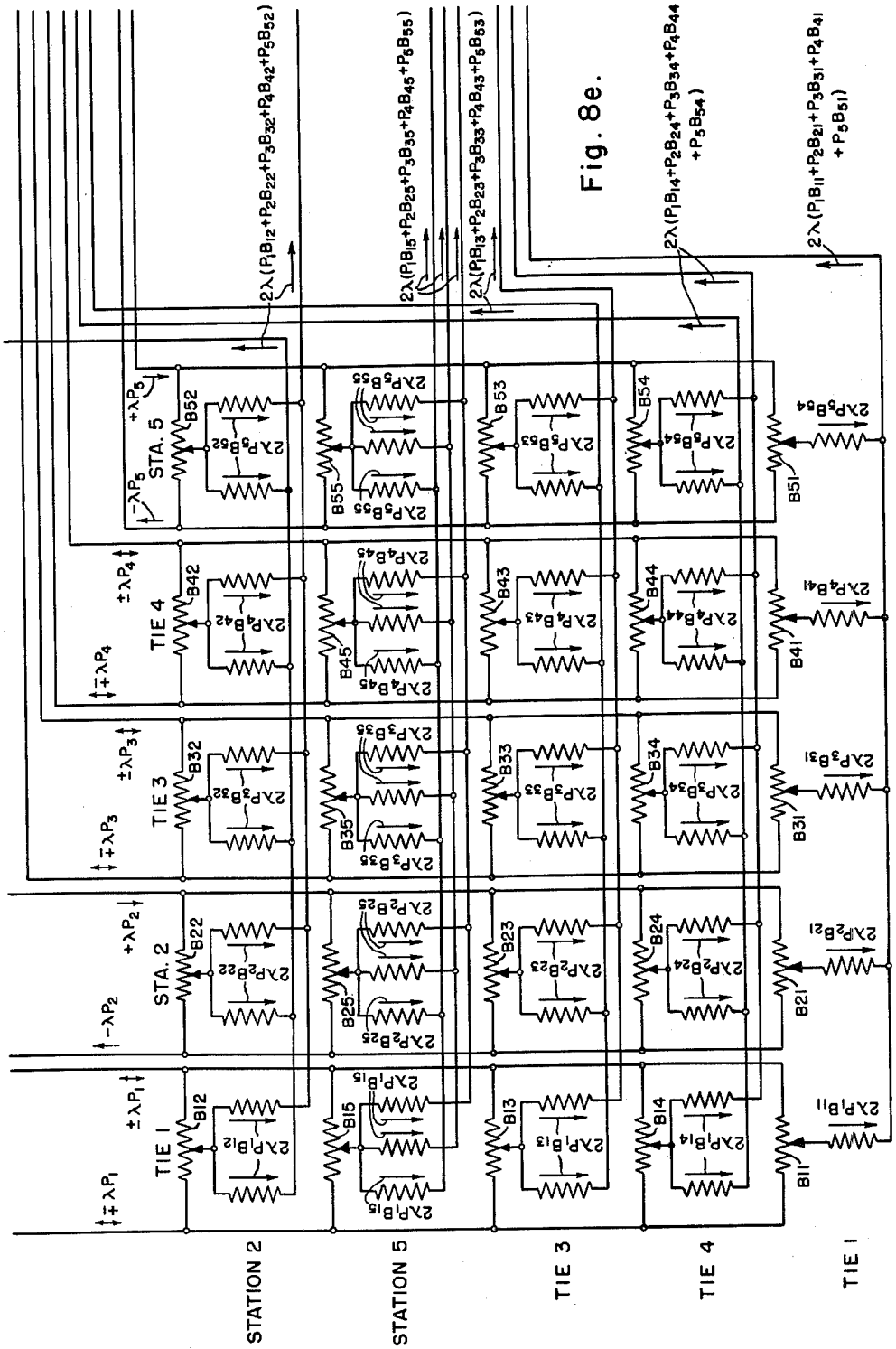
Figure 8F:
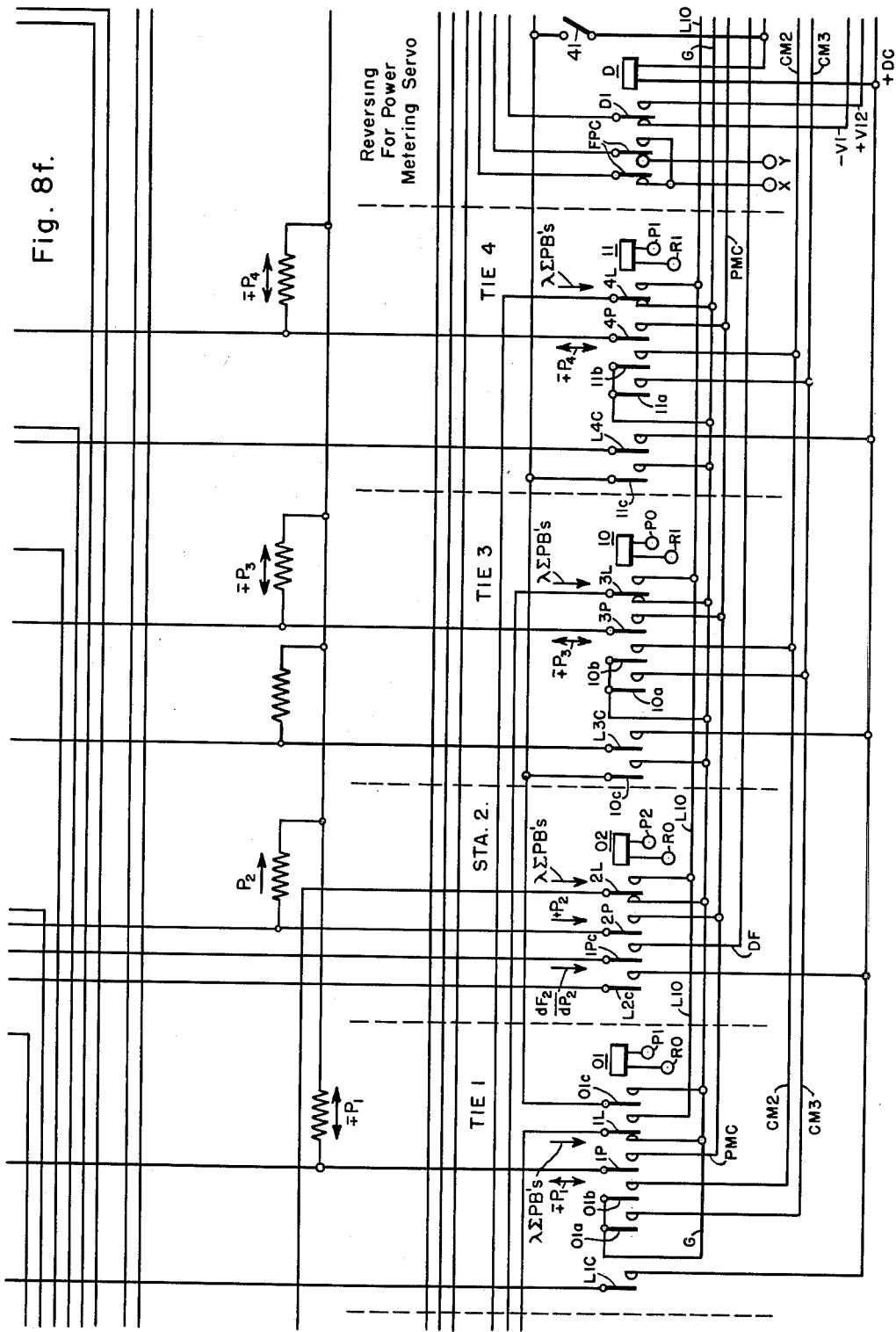
Figure 8G:
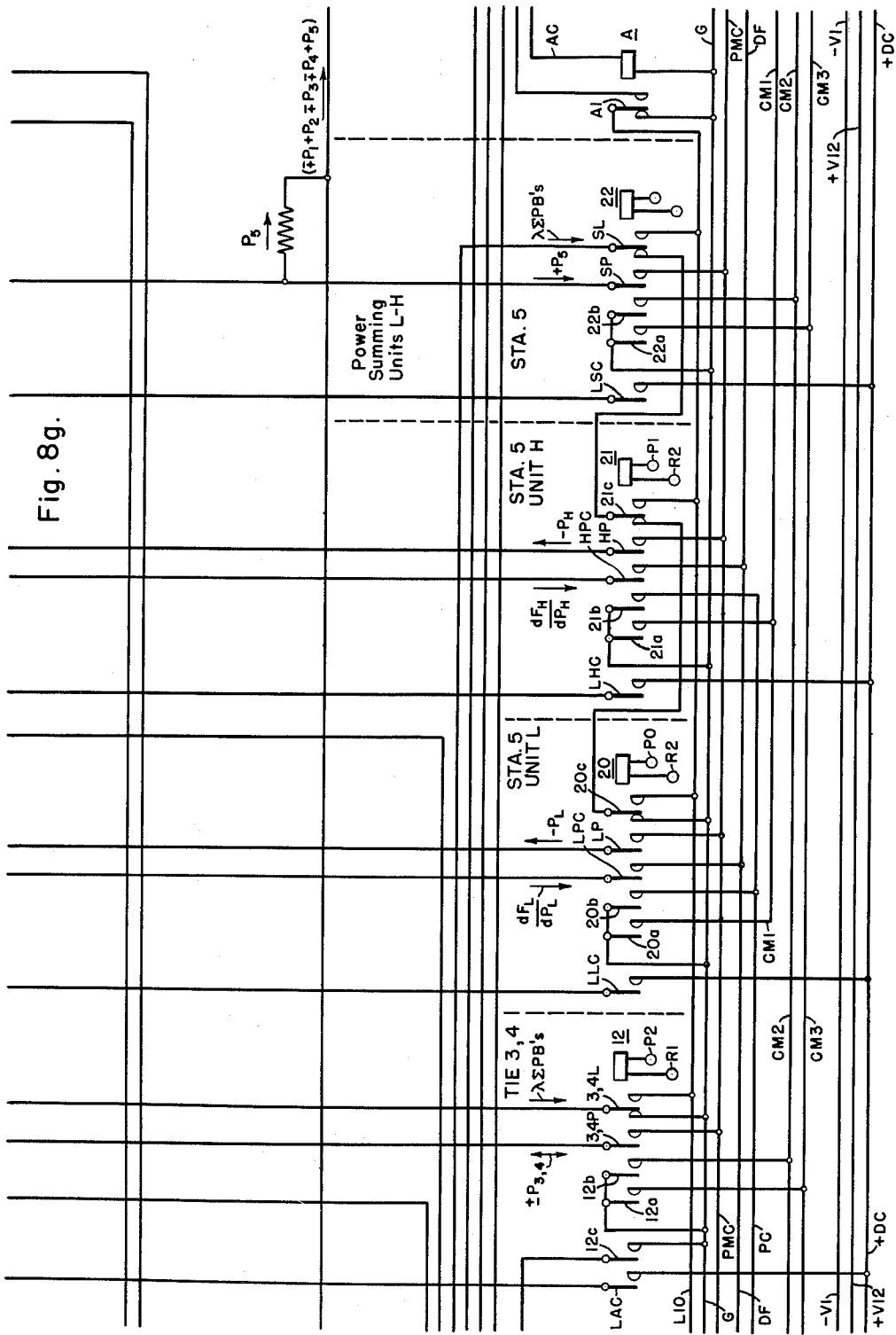
Figure 8H:
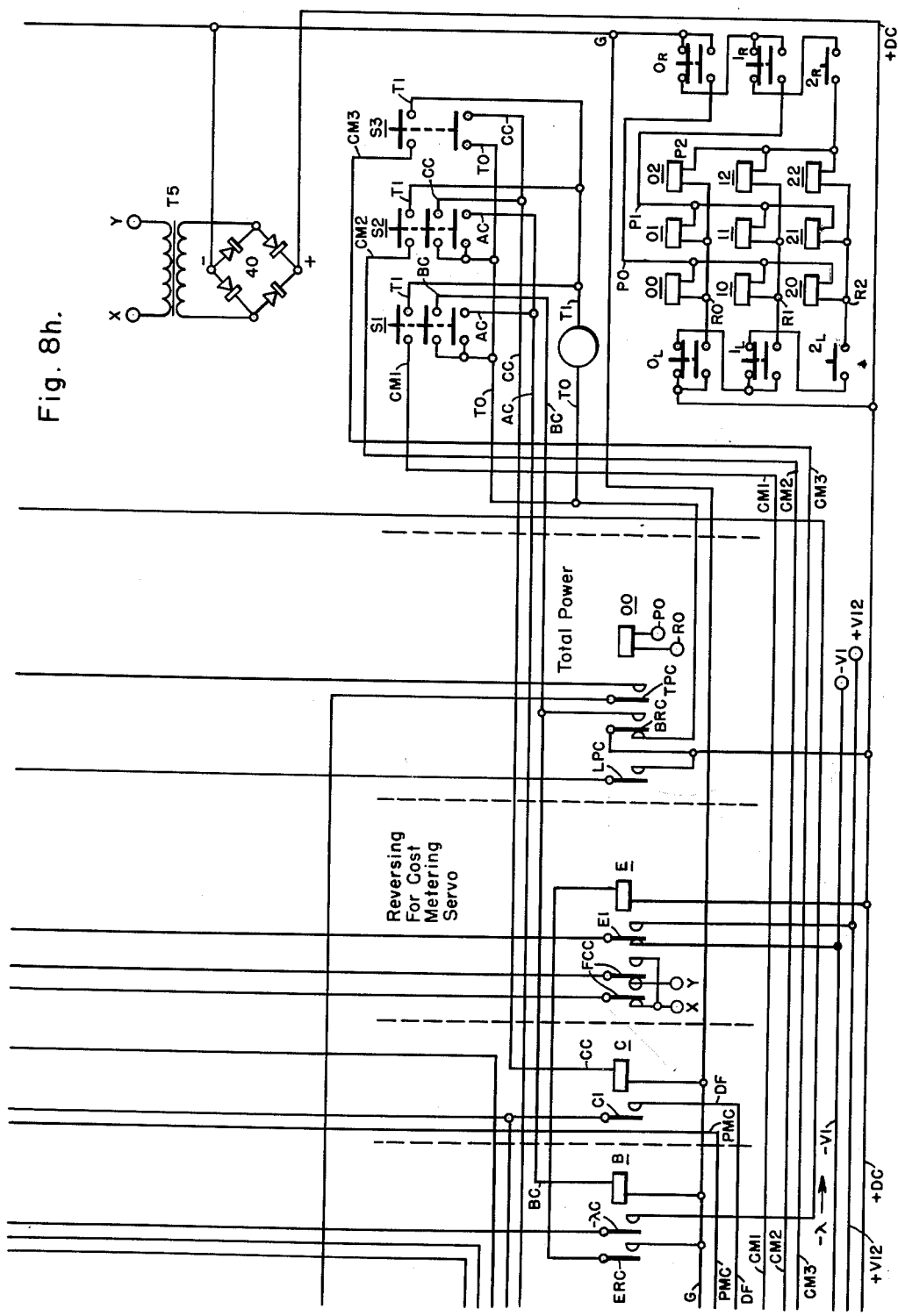
Figure 9:
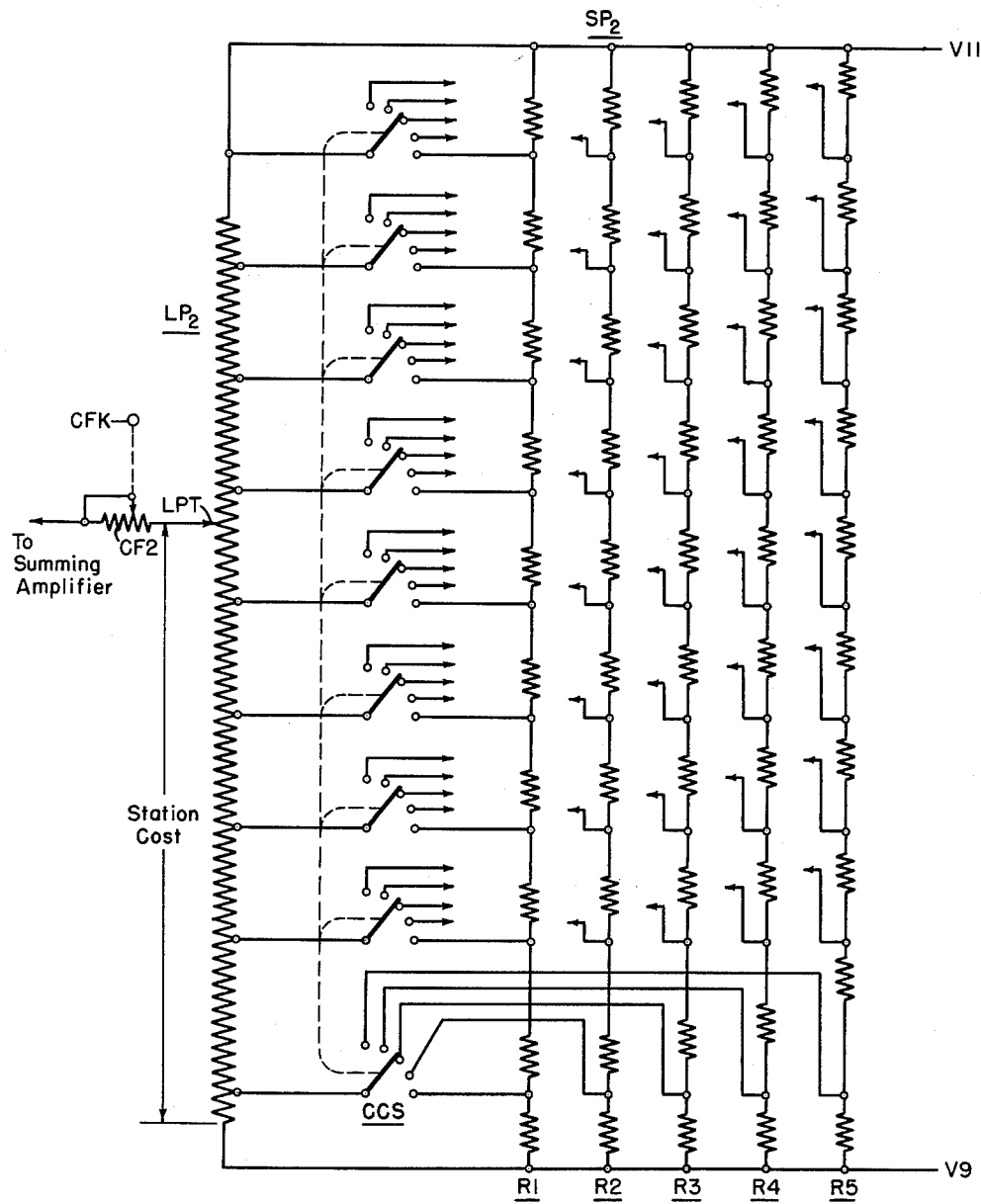

FIG. 3 is a group of curves plotting station net generation against total system generation and determined from the economic dispatch equations defining a power system such as shown in FIG. 1. These curves show the total system generation and individual station generations for particular values of incremental delivered power costs for the system as shown in FIG. 1, based on the consideration of zero tie power flows and all generating units available for service;

FIG. 4 diagrammatically illustrates a type of analogue computer useful in the solution of the economic dispatch equations for a three station system;

FIG. 5 diagrammatically illustrates a modified type of analogue computer useful in the solution of the economic dispatch equations defining a power system having two variable stations;

FIG. 6 diagrammatically illustrates a type of amplifier usable in the servo system of the computer of FIG. 5 and also in the computer illustrated in FIGS. 8a through 8h;

FIG. 7 shows the organization of the sheets of drawings for FIGS. 8a through 8h;

FIGS. 8a through 8h diagrammatically illustrate an analogue computer system applicable to the power system of FIG. 1;

FIG. 9 shows a passive analogue impedance circuit for representing several cost curves for a particular station; and FIGS. 10 through 15 show various metering dials employed in the system of FIGS. 8a through 8h, inclusive.

It has been found that the system fuel cost to supply a given load is minimum when incremental delivered power cost is the same for every variable station. This is logical since, if the incremental delivered power costs were different, total fuel cost could obviously be lowered by dropping some power from a station having a high incremental delivered power cost and raising correspondingly a station with a lower cost. There are, however, a few refinements that should be mentioned. The incremental delivered power cost is the sum of the incremental power production cost at the station, mainly fuel cost, and the incremental cost of transmission power losses. The latter cost depends both on the amount of incremental transmission power loss and on the price charged for it. It has been proved that the minimum fuel input to the system is actually obtained when incremental delivered power costs are the same for every variable generating station in the system, with the incremental transmission power losses charged at the incremental delivered power cost.

The term incremental delivered power cost is usually applied to the average incremental cost for the entire system load. However, taken over the system as a whole, the incremental cost varies from point to point, and in general for the economic dispatch condition, power flows from the low cost stations to the high cost stations in exactly the right amount, so that the incremental cost of the power losses entailed in the interchange flow exactly equals the differences in incremental station power production costs.

Reference has also been made to variable stations. Naturally, some stations may be fully loaded and operating at an upper limit at high system loads. When they reach the limit, the equations for these stations drop out of the economic dispatch equations, since above this point it is only feasible to make the delivered cost the same among the stations that are still variable. Likewise, certain stations may have a lower limit for area protection or from an operating consideration, and these units also are not regarded as variable units at these particular loads. Thus, the physical picture of a system operating in economic dispatch is that certain units may be operating at fixed loads and others at variable loads, but the incremental delivered power costs from all variable units are the same.

Other interesting tests give a good physical picture of the system under economic dispatch. For example, if a very small additional load is connected at any point in the system, power to supply it can be generated at any of the variable stations at the same cost. This applies to small increments and is explained by the fact that the flows in the system are such as to equalize the costs from all of the variable stations to each other or to any other point in the system. Another test is that of reducing the power supply, by a small amount, at one variable station and increasing another station sufficiently so that the load is unaltered. This also does not change the cost. Presumably more power would be required if this load were picked up at a lower cost station, because the losses from that station would be greater. However, the costs are the same.

The equations that describe the equality of delivered power costs are as follows:

[Station incremental production cost]
$+\lambda$[Incremental transmission loss associated with that station]$=\lambda$ where $\lambda$ is the incremental cost of delivered power. In general, there will be one such equation for every generating station and tie in the system. All of these equations are involved in the determination of the most economic dispatch for the system, but only those stations which are variable will be available to adjust the system generation to meet the requirements of the changing load. Hence, the variable stations determine the economic dispatch of the system. In the case of ten variable stations, there would, of course, be ten such equations and the incremental power loss (for each station) would contain ten terms plus a term for each fixed station or tie. This is because the incremental loss associated with the delivery of power from a particular station depends on how much that station and each other station or tie in the system is supplying at that time. Their solution for a particular value of $\lambda$ yields a set of station powers for the respective stations which constitute the economic dispatch for some system loading equal to their sum. Thus, by selecting 15 or 20 values of $\lambda$ covering the range of delivered power costs of interest on the particular system, the equations can be solved a sufficient number of times to obtain a family of economic dispatch curves. Each solution for a value of $\lambda$ yields one cross-section set of points on this family of curves.

In the drawings, FIG. 1 diagrammatically illustrates a fictitious electric power transmission system. This system involves two variable stations, respectively identified Station #1 and Station #5, having power connections with the transmission system, respectively designated $P_2$ and $P_5$. The system also includes two typical ties, the first of these is designated Tie #1 and represents a simple interconnection with some other electrical system or an electrical load. The point of interconnection of the transmission system and this tie is designated $P_1$, representing the power interchange at that point of the system. The second tie is split up into two sections, providing two tie points with a single load, or an adjoining power system, which may be required in certain instances if the load is such that more than one point is required to handle the power interchange. This tie arrangement involves the two tie connections generally designated Tie #3 and Tie #4, respectively, and the electric powers interchanged at the respective points are designated $P_3$ and $P_4$, respectively. This system is not intended to represent any particular power transmission system but is merely an arrangement involving certain typical situations existing in electric power systems on which certain of the subject matter of this application is based.

A further simplification relates to the character of the generating stations in this system. These are assumed to be steam-electric types of generating stations. Station #2, while indicating a single generating unit, may involve a more complex internal arrangement of boilers and generators, which may be arranged in various combinations to deliver electric power to the station bus. However, it is assumed in this arrangement that all of the steam-electric units have corresponding thermal efficiency characteristics, which may be represented in a single analogy network for producing electrical quantities which are functions of the incremental power production cost of the station.

Station #5 indicates two different types of units. One unit is designated L and the second is designated H. The respective powers produced by these units are designated $P_L$ and $P_H$. Thus, with both units operating, the total power produced by Station #5 may be represented as the sum of the generations of the respective units and may be expressed as $P_L+P_H=P_5$. This is feasible, in this instance, since the generating units have a common point of interconnection with the electric power transmission system at $P_5$. Thus, the transmission losses for both of the units will be the same. The method of handling this sort of a situation in an analogue computer will appear in connection with the discussions concerning FIGS. 8a through 8h.

Figure 2:
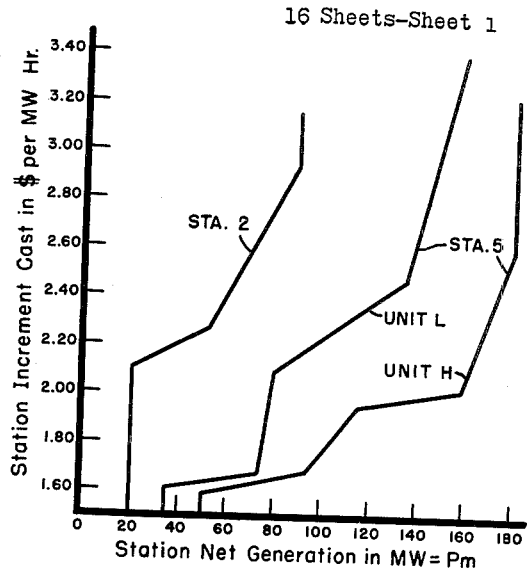
FIG. 2 is a typical set of curves depicting generator station incremental power production cost for a generating station arrangement such as shown in FIG. 1.

FIG. 2 illustrates a series of curves plotting the station incremental power cost in dollars per megawatt-hour against the station net generation in megawatts. These curves characterize the thermal efficiency characteristics of the station which determines their shape. They may be referred to as heat rate curves showing B.t.u./mw.-hr. plotted against mw. In this instance, however, $/mw.-hr. are plotted against mw. Thus, these curves are referred to as the cost curves for a power station. The curves are respectively identified with the stations in the system illustrated in FIG. 1, showing the curve for Station #2 and the respective curves for units L and H of Station #5. It will be noted that these curves embody a series of straight line approximations which closely depict the actual station cost characteristic. The manner in which these curves may be determined is believed to be apparent from the general discussions which have been made hereinbefore, and it will be appreciated from these discussions that these curves may change with changing fuel costs. Fuel costs alone, however, as noted, will not change the characteristic of the curves which are indicated. However, a change in the combinations of the units used in the various stations for producing power at any particular time may result in changes in the characteristics of the curves. Hence, separate sets of curves covering the range of expected fuel costs and for different combinations of equipment in the station will be necessary. In the interest of simplicity, however, only a single assumption has been made here and a single curve for the respective units has been indicated.

FIG. 3 illustrates a group of three curves based on the solution of the economic dispatch equations defining a system such as illustrated in FIG. 1. As noted above, these equations are solved for different values of $\lambda$ covering the range of delivered power costs of interest on the system by selecting different valves of $\lambda$ and solving the equation simultaneously. A particular value of power for each of the units in question, for example, the generating units in FIG. 1, may be obtained by plotting the individual station net generation in megawatts against the total system generation in megawatts for each particular value of $\lambda$. These curves then indicate the incremental delivered power cost for any particular value of total system generation. Thus, for a given load on the system with the power at all fixed stations and ties being known, it is possible from this set of curves to determine the condition of economic dispatch. However, to simplify the plotting and the interpretation of these curves, the assumption is made that power interchange at the ties is zero and that all generating units are variable.

The economic dispatch curves shown in FIG. 3 are known as precalculated curves for obvious reasons. They are necessarily based on certain fixed conditions of the system, for example, a fixed network is assumed. The curves are also based on zero power in all interconnections with neighboring systems and on full availability of units in all generating stations, that is, no units out of service for maintenance at the time. Fixed fuel cost at each of the various stations is also assumed. Also, the economic dispatch so obtained involves specific loads in the various transmission lines in the system. It is entirely possible that some conditions represented are not feasible due to the limitations of transmission facilities or equipment.

Several conditions may necessitate an obectionable number of precalculated dispatch curves to cover adequately the range of operating conditions encountered in a particular system. A large number of curves is objectionable for two reasons. First, the operator never quite knows which to use and is likely to be confused by trying to interpolate between non-applicable curves, and second, an excessive number must be recalculated for each major change in fuel cost or each new construction of the system.

Factors necessitating numerous precalculated curved families include:

(1) Alternate fuel cost possibilities at a station.
(2) Taking units out for maintenance.
(3) System too extensive to utilize the approximations involved in a single family of dispatch curves.
(4) System growing rapidly involving new construction. This necessitates only one change in the computer for a change in the system, but may require recalculation of a great many precalculated curves for some systems.
(5) Different schedule flows in the lines.
(6) Different economic interchange conditions.
(7) Dispatches to obtain cost of power at interconnections.
(8) Dispatch curves for system planning.
(9) Curves for other temporary or emergency conditions.
(10) Various combinations of boilers and machines used in the station.

These conditions indicate a need for a computing device that can be used directly in the dispatching office to show the correct dispatch at all times. Such a device should incorporate provision for convenient alteration as the loss formula changes due to construction of transmission lines, etc. Changes in fuel cost should be easily represented without changing the entire thermal efficiency curve of the station. Highly desirable would be a direct indication of the cost of power at interconnections. Since the savings due to more effective operation of economic interchange based on more accurate knowledge of cost can easily approach the other more obvious savings of economic dispatching, the computer should show the average delivered power cost, that is, the incremental delivered power cost, and the cost at various generating stations and ties. In some cases, it would be desirable to tie the computer to the automatic load control of the system, the computer acting as the sensing element detecting and correcting for deviations from economic dispatch.

FIG. 4 illustrates a type of manual computer using analogue circuits suitable in the solution of a set of simultaneous equations defining a system involving three variable stations. This does not relate specifically to FIG. 1, but rather to an interconnected three station system having no ties to simplify. However, the general considerations regarding the stations of FIG. 1 are applicable here. This computer solves the equations by an iteration process which is similar to that employed according to one method in manual calculations in solving the equations. For a three station interconnected system the total power loss equation is $$L=P_1^2 B_{11}+2P_1 P_2 B_{12}+P_2^2 B_{22} +2P_2 P_3 B_{23}+P_3^2 B_{33}+2P_1 P_3 B_{13}$$

In this equation the respective generated powers for these stations are represented by $P_1$, $P_2$ and $P_3$. The self coefficients relating to transmission losses are $B_{11}$, $B_{22}$ and $B_{33}$, and the mutual transmission loss coefficients are $B_{12}$, $B_{13}$ and $B_{23}$. It will be noted that there is a power square term for each of the three stations and a cross product term for each station, respectively, multiplied by the corresponding self and mutual B coefficients, providing a term by term expression of system power transmission losses involving the respective stations. The derivation of such a loss expression will be apparent from the AIEE paper identified hereinbefore.

The incremental transmission power losses for the respective stations are obtained by taking the partial differential of the total loss expression with respect to the individual stations. Thus, the incremental power losses with respect to the respective stations are given by $$\frac{\partial L}{\partial P_1} = 2P_1B_{11} + 2P_2B_{21} + 2P_3B_{31}$$

$$\frac{\partial L}{\partial P_2} = 2P_1B_{12} + 2P_2B_{22} + 2P_3B_{32}$$

$$\frac{\partial L}{\partial P_3} = 2P_1B_{13} + 2P_2B_{23} + 2P_3B_{33}$$

As noted earlier, the fuel input to the system is a minimum if at every variable generating station

[Station incremental production cost]
  +λ[Incremental transmission loss
    associated with that station]=λ which may be expressed symbolically as $$\frac{dF}{dP} + \lambda \frac{\partial L}{\partial P} = \lambda$$

This represents the economic dispatch for any one of the three stations. In this equation, F represents production cost for the station, P represents the station power, $$\frac{dF}{dP}$$

represent the station incremental production cost $$\lambda \frac{\partial L}{\partial P}$$

represents the incremental cost of transmission power losses with respect to the station and λ is a La Grange multiplier which, at the economic dispatch, is defined as the incremental delivered power cost.

Thus, the economic dispatch equations for the three station system, substituting the incremental transmission power losses derived above become:

$$\frac{dF_1}{dP_1} + 2\lambda(P_1B_{11} + P_2B_{21} + P_3B_{31}) = \lambda$$

$$\frac{dF_2}{dP_2} + 2\lambda(P_1B_{12} + P_2B_{22} + P_3B_{32}) = \lambda$$

$$\frac{dF_3}{dP_3} + 2\lambda(P_1B_{13} + P_2B_{23} + P_3B_{33}) = \lambda$$

The solution of these equations is provided by the analogue computer diagrammatically illustrated in FIG. 4, which provides for the term by term representation, as element voltages, of the terms of the economic dispatch equations set forth above. The system is adapted for energization with alternating-current represented in conductors L1 and L2, which supply an autotransformer generally designated AT having an adustable tap AT1. The primary winding PW of a transformer generally designated λT is connected across the tapped section of the autotransformer AT and may, therefore, be energized with selectively variable magnitudes of alternating-current voltage. Transformer λT is provided with a plurality of secondary windings arranged in groups of three. The first group of three is identified $S_{11}$, $S_{21}$ and $S_{31}$. The second group of transformer secondary windings are respectively identified $S_{12}$, $S_{22}$ and $S_{32}$, and the third group respectively are identified $S_{13}$, $S_{23}$ and $S_{33}$. An additional winding $S_{10}$ is also provided. This transformer may be identified as the λ transformer, the respective windings of the three groups each having induced therein a voltage of a magnitude corresponding to 2λ, while the winding $S_{10}$ has a voltage induced therein corresponding to λ as indicated. Winding $S_{11}$ is connected across a potentiometer $B_{11}$ by means of a switch 1. Thus, a voltage corresponding to 2λ is applied across the potentiometer $B_{11}$. Similarly, windings $S_{21}$ and $S_{31}$ are connected across respective potentiometers $B_{21}$ and $B_{31}$ by switches 4 and 7, respectively, so that each potentiometer is energized by a voltage corresponding to 2λ. Similarly, the respective windings of the remaining two groups of secondary windings are connected across respective potentiometers $B_{12}$, $B_{22}$, $B_{32}$, $B_{13}$, $B_{23}$ and $B_{33}$ by respective switches 2, 5, 8, 3, 6 and 9, so that each of the named potentiometers is energized by a voltage corresponding to 2λ.

The tape of potentiometers $B_{11}$, $B_{12}$ and $B_{13}$ are mechanically ganged with the tap of a potentiometer assembly designated $SP_1$ which is controlled manually. These ganged taps are simultaneously rotated by means of a manually operated knob K1 which drives a dial D1. Similarly, potentiometers $B_{21}$, $B_{22}$ and $B_{23}$ are mechanically ganged with the tap of a potentiometer assembly generally designated $SP_2$, and these taps are simultaneously driven by a knob K2. Likewise, the taps of potentiometers $B_{31}$, $B_{32}$ and $B_{33}$ are mechanically ganged with the tap of a potentiometer assembly designated $SP_3$ and driven by a knob K3. The respective knobs drive dials D1, D2 and D3, which may be calibrated in terms of megawatts or kilowatts of power for the respective stations. Potentiometer assemblies $SP_1$, $SP_2$ and $SP_3$ generate voltages simulating points on cost curves such as illustrated in FIG. 2. These each comprise a linear tapped potentiometer having an adjustable tap, the fixed tapped sections of the potentiometer having unequal resistors connected there across to provide non-linear characteristics to the potentiometer, the voltage at any point on the potentiometer therefore corresponding to a point on the non-linear cost curves of the type shown in FIG. 2. Since the taps of the respective station potentiometers $SP_1$, $SP_2$ and $SP_3$ are rotated as a function of station power, it follows therefore that the voltage tapped from any point on the respective station cost potentiometers will be the incremental production cost $$\frac{dF}{dP}$$

Also, it follows that the voltage tapped from the respective B potentiometers with rotation of the respective knobs will represent the incremental cost of transmission power losses associated with the power developed by that particular station. In the drawing, the various circuit elements have been identified with reference characters corresponding to those appearing in the terms of the economic dispatch equation above. Consequently, the terms of this equation can be picked off by going around the respective loops which sum the corresponding terms of the equations.

The solution of the equations is obtained by selecting arbitrary values of λ. This is accomplished by adusting the tap AT1 of the autotransformer which simultaneously applies a voltage proportional to 2λ to the various B potentiometers. At the same time, the secondary winding $S_{10}$ has induced therein a voltage of a magnitude corresponding to λ. To solve the equations, a null indicator, which may be any suitable type of zero center instrument, is provided. This null indicator is supplied with the voltage λ from secondary winding $S_{10}$, which is selectively opposed to the λ values produced in the respective computer channels, and compared in the null indicator, by selective closing of switches S1 through S3.

Thus, to solve the equations, for example, switch S1 will be closed. Prior to this, all of the station dials will have been rotated to zero power positions. The dial for Station #1 is now rotated in the increasing power direction, simultaneously adjusting the taps of all of the potentiometers mechanically ganged therewith. The voltage tapped from potentiometers $SP_1$, $B_{11}$, $B_{21}$ and $B_{31}$ are algebraically combined in series in the computer circuit connecting these potentiometers. The sum of these voltages according to the economic dispatch equation for Station #1 is equal to $\lambda$. Thus, when the null indicator reads zero, the power for Station $P_1$ is indicated on dial D1. This same procedure is followed for both Stations #2 and #3 by selectively closing switches S2 and S3 and separately nulling the generated voltages in these respective computer loops against the $\lambda$ voltage in the null indicator. It will be noted that in the solution of these equations that only an approximation of station powers is obtained by this first adjustment, since, in adjusting Station #1, the generated powers at Stations #2 and #3 have been ignored. Similarly, in adjusting Station #2, the power of Station #3 is ignored. Thus, it may be necessary to repeat this process two or three times in order to obtain a sufficiently accurate indication of the powers at the respective stations. This solution of the equations holds for a single value of $\lambda$ and gives the most economic dispatch for some system load represented in the total power obtained by combining the power indications of dials D1, D2 and D3. By repeating this procedure for different values of $\lambda$ selected by adjusting the tap AT1 of the autotransformer, the economic dispatch for all system loads may be obtained.

The system herein illustrated has been set forth in approximately its simplest form. It will be appreciated that the system may be expanded to include any number of variable stations and may be further expanded to include the fixed power conditions at fixed stations and at ties. Each fixed station and tie will be represented by its dial, on which the known power at that station or tie will be set. The only dials which would be adjusted for such a situation would be those representative of the variable stations in the system. However, since the transmission losses for any station involve the cross product terms with fixed stations and ties, it will be appreciated that these terms will have a bearing on the ultimate determination of economic dispatch for a given system load.

Should any one of the stations be operating at one of its limits, as indicated by the setting of its dial, whether this be an upper or a lower limit, the null for that station is ignored. Mechanical stops (not shown) operatively associated with the three shafts for the respective stations may be utilized to set the upper and lower limits of the station.

The representation of a tie in the system would be handled differently than that for a station. As a general rule, a tie does not have an incremental cost curve. In other words, the cost of power at a tie is usually charged at the average power cost of the system referred to as the incremental delivered power cost $\lambda$. Thus, a tapered potentiometer, such as potentiometer $SP_1$, for instance, which is used to indicate the incremental cost curve for the station, is not needed, a linear potentiometer being used to produce a power quantity. In such case, only a potentiometer such as $B_{11}$ would be required, so that the particular value of power at the tie represented by rotation of the shaft could be set into the potentiometer. This setting would apply as long as the tie flows were fixed and would require resetting with a change in power interchange at the tie represented thereby.

Switches 1 through 9 are provided to properly phase the A.C. voltages $2\lambda$ appearing across the respective B potentiometers. By this means it is possible to simulate power conditions involved in the dispatch of power from this system to another system and the flow of power into the system at a tie from another system. Power interchange at a tie is regarded as negative when the power flows from the system for which the economic dispatch is being computed and is considered as positive when flowing into the economically dispatched system from an adjoining system. The use of the switches, therefore, provides a convenient arrangement for properly phasing the analogus circuits to properly simulate the power flow conditions in the power system.

In the embodiment of the invention illustrated in FIG. 5, certain improvements and simplifications are embodied. In this arrangement, rather than have as many potentiometers on each shaft as there are variable generating or power sources, only three potentiometers are used on each shaft, the cost of losses being developed as current terms in fixed resistors or rheostats, rather than as voltages on the shafts themselves. This improvement reduces the number of potentiometers required on each shaft. In this figure, parts corresponding to those illustrated in FIG. 4 bear like reference characters. This system, in the interest of simplicity, simulates only a two station arrangement having two computing sections for the respective stations. The loss equation for a two station system may be written as follows:

$$L = P_1^2 B_{11} + 2P_1 P_2 B_{12} + P_2^2 B_{22}$$

from which the incremental transmission power losses with respect to the respective stations become $$\frac{\partial L}{\partial P_1} = 2P_1 B_{11} + 2P_2 B_{21}$$

$$\frac{\partial L}{\partial P_2} = 2P_1 B_{12} + 2P_2 B_{22}$$

By substitution the economic dispatch equations for the two station system are $$\frac{dF_1}{dP_1} + 2\lambda(P_1 B_{11} + P_2 B_{21}) = \lambda$$

$$\frac{dF_2}{dP_2} + 2\lambda(P_1 B_{12} + P_2 B_{22}) = \lambda$$

Here again the incremental cost curves for the stations are duplicated in respective potentiometer assemblies $SP_1$ and $SP_2$, which have the function described in connection with FIG. 4 producing the respective tapped voltages representative of the incremental production costs for a particular value of power represented in rotation of the station potentiometer shaft.

This system automatically computes the economic dispatch through the provision of respective servo arrangements S1S and S2S for the two stations. The motors utilized are two phase motors which are inherently heavily damped, which is desirable in such an application. Each motor is provided with two field windings, the fluxes of which are in quadrature relation according to conventional practice. With regard to servo motor S1S, the fixed field winding is identified FS1 and is adapted for energization with alternating current of some fixed magnitude. The control field winding designated CS1 is variably energized with reversible phase alternating-current determined by the output of an amplifier generally resignated S1A, the input to which depends upon the output of the station servo as determined by a summation of currents representing the terms of the economic dispatch equation for the station, as will be described at a later point. The servo for Station #2 comprises a motor negerally designated S2S having a fixed alternating-current excited field winding FS2 and a control field winding CS2, controlled by the output of an amplifier S2A in a manner corresponding to that generally outlined with regard to the servo of Station #1. The computer, in addition to solving the economic dispatch equations for the two station system noted hereinabove, also solves the equation $P_1 + P_2 - P_T = 0$ which shows the sum of the generations for the respective station equal to the total power of the system. The dispatcher usually knows the total load on the system and is, therefore, in position to determine the total generation that is required to carry this load. As such, the system is arranged so that the dispatcher may insert a voltage proportional to the total power requirement. This voltage is compared with the sum of the voltages respectively representing the economic dispatch of power for the respective generating stations to achieve economic dispatch.

To this end, a total power transformer PT is provided. This transformer is energized with alternating current. The voltage $P_T$ tapped by the adjustable tap of this potentiometer indicates the total power requirement of the system. Each servo section in the computer is provided with a power potentiometer. These are respectively designated $PP_1$ and $PP_2$ and are interconnected in such a way that the respective power voltages $P_1$ and $P_2$ tapped therefrom in response to adjustment of the respective taps by operation of the respective servo motors are added and compared with the total power voltage $P_T$ in the primary winding of a differential transformer DT. The voltages applied to the respective power potentiometersters $PP_1$ and $PP_2$ are derived from respective secondary windings TS1 and TS2 of a transformer generally designated T. The magnitude of the voltage applied across the respective potentiometers is such that the tapped portion at any shaft position is proportional to the generation of that station. Movement of the respective taps to their upper limits may correspond to the upper limits of generation of the respective stations. These voltages, of course, are scaled in correspondence with the voltage derived at the total power potentiometer PT.

The voltage induced in the secondary winding DTS of the differential transformer DT is, therefore, proportional to the difference between the sum of the station power voltages tapped at the respective power potentiometers and the total power requirement for the system. This differential voltage is applied as input to a $\lambda$ servo amplifier $\lambda A$, the output of which excites the control field winding CS$\lambda$ of the $\lambda$ servo generally designated $\lambda S$. The fixed field winding of this servo, FS$\lambda$, is excited with alternating-current as in the case of the station servo. The rotor of the $\lambda$ servo motor drives an adjustable tap AT1 of an alternating-current excited autotransformer AT, the tapped voltage of which is applied to the primary winding PW of $\lambda$ transformer $\lambda T$. This latter transformer is provided with a center tapped secondary winding SW, the center tap of which is grounded. Thus, at a given instant, the voltage across the ends of this secondary winding with respect to ground may be identified as $+\lambda$ and $-\lambda$, respectively, as indicated to indicate their instantaneous opposite phase relation. The tapped sections of secondary winding SW are applied across respective $\lambda$ potenitometers S1$a$ and S1$b$ in the Station #1 servo system and S2$a$ and S2$b$ in the Station #2 servo system. The taps on all of these potentiometers are driven by the servo motors associated therewith. Consequently, the position of the respective taps at any instant corresponds to the power requirement of the particular generating station, so that, for example, with respect to potentiometer S1$a$, the voltage and, hence, the current in the circuit connected with the tap, may be identified as $+\lambda P_1$. Corresponding considerations apply to the voltages and currents tapped at the adjustable taps of the other $\lambda$ potentiometers, giving the remaining currents $-\lambda P_1$, $+\lambda P_2$ and $-\lambda P_2$, which are fed out over the indicated circuits to a suitable switching arrangement comprising independent switches RS1 and RS2 for feeding selected $\lambda P$'s into the B coefficient resistors and rheostats, at which point the proper cost terms for the power losses in the transmission lines of the system are developed.

At this point, it may be well to note that certain B coefficients appearing in the incremental power loss equations for the respective stations may not be represented in the expression of total power loss for the system. The occurrence of these terms with subscripts reversed, for example, $B_{12}$ and $B_{21}$, is done merely so that the final subscript corresponds to the numerical designation of a particular power source and is not done to indicate a difference in value of the loss coefficient. Thus, the coefficients $B_{12}$ and $B_{21}$ are numerically equal. In the computer, these coefficients must be generated in separate electrical circuits. Hence, referring to rheostats $B_{12}$ and $B_{21}$, these appear in separate electrical circuits, but since the resistances thereof will be numerically equal, they may be mechanically ganged, as shown, so that they may be simultaneously equally adjusted. In a two station system, such as herein indicated, separate adjustment is not a major problem. However for a system with 20 variable stations and ties, this would reduce the number of hand settings required for a change in the system from 400 to 210, with consequent great saving in time together with an improvement in accuracy.

Assuming the switches RS1 and RS2 to be engaged with the upper terminals thereof, as viewed in FIG. 5, the terms $+\lambda P_1$ and $+\lambda P_2$ are supplied to the B coefficient circuits. $+\lambda P_1$ is supplied directly to the B coefficient resistor $B_{11}$, which is scaled to produce the factor $2B_{11}$. Thus, the output current corresponds to $2\lambda P_1 B_{11}$, as indicated. The other term of the incremental loss expression for Station #1, which is $2\lambda P_2 B_{21}$, is obtained through the application of $+\lambda P_2$ to rheostat $B_{21}$ by closing switch RS1. This is combined with $2\lambda P_1 B_{11}$ at the left terminal of the ammeter A1. This current flows through the ammeter to junction J1, where it is combined with the incremental production cost current for Station #1

$$\frac{dF_1}{dP_1}$$

which flows through switch 31$a$, which is now closed. Also combined with this current is a negative current, designated $-\lambda$, taken from the conductor connected to the $-\lambda$ terminal of the $\lambda$ transformer $\lambda T$, whence the sum of the currents at J1 will be equal to zero when the algebraic sum of the incremental production cost current, the incremental cost of loss currents and the $-\lambda$ current equal zero at junction J1. The differential current at J1 is applied to the input of servo amplifier S1A, which controls the excitation of the control winding CS1 of servo motor S1S. The phase of this exciting current with respect to the fixed excitation current of winding FS1 is such that the servo motor rotates to change the power settings of all of the potentiometers connected thereto to reduce the differential current at J1 to zero. It will be appreciated from the out-of-phase relationship of the $-\lambda$ currents to the cost currents of the economic dispatch equation that the phase of the current controlling the amplifier S1A, and, consequently, the phase of the output current of amplifier S1A, will reverse depending upon which is the greater.

Similar considerations apply to the servo system defining Station #2, wherein closure of switch 32$a$ combines the incremental production cost of the station, $$\frac{dF_2}{dP_2}$$

with the incremental cost of transmission loss currents $2\lambda P_1 B_{12}$ and $2\lambda P_2 B_{22}$ at junction J2 to control amplifier S2A which controls the excitation of control field CS2 of servo S2S.

The adjustment of the taps of respective power potentiometers $PP_1$ and $PP_2$ results in the summation of the two power voltages $P_1$ and $P_2$ which are opposed to the voltage PT in the primary of the differential transformer DT. As long as a differential voltage exists in the primary of this transformer, the $\lambda$ servo operates, continually changing the values of $+\lambda$ and $-\lambda$, which increase or decrease correspondingly in their respective instantaneous positive and negative senses. This continually changing magnitude of the λ voltages keeps the respective servos operating until such time as the sum of the power voltages $P_1$ and $P_2$ equals the total power $P_T$, at which time the system stops. At this point the dials $P_1D$ and $P_2D$ indicate the respective power requirements of Stations #1 and #2 to the dispatcher.

It will be noted that the respective incremental power cost currents $$\frac{dF_1}{dP_1} \text{ and } \frac{dF_2}{dP_2}$$

are applied to the system through respective autotransformers CFT1 and CFT2. These are referred to as the cost factor transformers and provide for the accommodation of changing fuel costs at the respective stations. The respective potentiometer assemblies $SP_1$ and $SP_2$ are designed for a base case value. Thus, departures in fuel cost from this base value must be represented in the system. Since the change in fuel cost does not change the thermal efficiency of the unit for the combination of boilers and turbines in service, all that is required is an arrangement for shifting the cost curve. Thus, an incremental change in fuel cost from the base value is simply accommodated by shifting the adjustable tap of respective transformers CFT1 and CFT2 to some position displaced from the fixed tap connection of the respective cost factor potentiometers.

It will be appreciated that this system may be expanded to include more stations, either fixed or variable, and ties or interconnections with other power companies. Assuming such an expanded system, and assuming further that the computer section for Station #1 represents a tie, a feature is included for indicating the cost of power at a tie line which is nedeed for selling power to a neighboring company. When tie power is to be metered, switch 31a is opened and switch 31b is closed. Opening of switch 31a disconnects the incremental production cost electrical quantity $$\frac{dF_1}{dP_1}$$

from the system, and closing of switch 31b grounds the input to the servo amplifier S1A, rendering the servomotor inoperative. The servo is not needed unless the tie has an incremental cost curve which is usually not the case. Knob K1 is now rotated to indicate the amount of power which is to be sold at the tie. This adjusts the taps of both potentiometers S1a and S1b, as well as the tap of potentiometer $PP_1$, the dial of which indicates the magnitudes of the tie power $P_1$. The incremental cost of losses entailed with the sale of this power at the tie are computed through the B coefficient circuits previously described, and the differential of these loss terms and the incremental delivered power cost $-\lambda$ are indicated by the ammeter A1, the other side of which is connected to terminal J1 and grounded through a resistor and switch 31b in parallel, as shown. The equations for reading incremental tie power cost are $-[2\lambda(P_1B_{11}+P_2B_{21})-\lambda]=$ Incremental power cost at tie for Station #1

$-[2\lambda(P_1B_{12}+P_2B_{22})-\lambda]=$ Incremental power cost at tie for Station #2 and are readily undertsood from the legends on the circuitry for each of the computer sections. In this operation with the tie line shaft, now adjusted by knob K1, set for a given amount of power at the interconnection point and the rest of the computer set for the corresponding dispatch of the generation and ties of the system, the tie line incremental cost meter A1 will indicate the incremental cost at the tie for this condition. If the tie power shaft is adjusted to a larger value, the computer will automatically reposition itself to the economic dispatch of that larger amount of power and again the tie line incremental cost will be indicated on the meter. For the block of load to be sold, the cost is the integral under the curve of incremental cost plotted against power over the tie from the beginning to the end of the block being sold. For example, if 100 megawatts of power are to be sold, the last few megawatts are probably at a higher cost than the first few megawatts, and the correct average is obtained by integrating under the curve. Sufficient readings can be taken as the tie line shaft position is increased from the beginning to the end of the desired sale megawatts to plot this curve. Ordinarily, it will be sufficient to take the first point and the last point and average them for moderate sales. It will be appreciated that any method of measuring the differential currents other than the meter illustrated may be employed since the meter merely illustrates the principle that is involved.

With the computer arrangement shown, it is possible to measure the cost of power at a generator station bus. If the generating station is operating and variable, the incremental cost is, of course, the same as the generating station incremental production cost at that point. The operation of determining the cost of power at a variable station can be done entirely on the computer as follows. Suppose a block of power is to be sold from Station #2. Note the present generation at that station and raise the fuel cost at that station by an arbitrary amount, either an arbitrary percentage or an arbitrary millage per killowatt of generated power, it does not matter which. To obviate the possibility of disturbing the cost setting on the cost factor transformer associated therewith, such as, for example, the cost factor transformer CFT2, a second transformer T1 is provided to provide this arbitrary percentage change. The secondary of this transformer is designated T1S and when the switch 33 is moved to engage its left-hand terminal, a tapped portion of the secondary winding is connected in the incremental production cost circuit. This tap is adjustable, as required, to introduce the arbitrary percentage change. When this is done, the computer will then rebalance and the economic dispatch for this new fuel cost indicated by ammeter A2. This new fuel cost is noted and the generation is noted at which the computer balanced. The original fuel cost setting is restored by switching switch 33 to its right-hand terminal. Thereafter, the knob K2 is rotated to increase the generation at Station #2 until the cost indicated on ammeter A2 (which indicates incremental cost at a generator bus or tie) again comes up to that at which the computer previously balanced automatically. This power increase is the amount of power sold over the tie and the rate at which the computer balanced is the cost, thereby giving one point on the curve of incremental cost versus sale power. This process can now be repeated with a larger fuel cost increment, giving a second point on the curve. In this way, as many points as desired can be read directly from the computer. For large blocks the curve can be plotted and integrated, but for small blocks it will probably only be necessary to read a few values and determine the rate directly.

The specific steps whereby this may be accomplished are listed sequentially below to summarize the discussion above.

(1) Raise the fuel cost with switch 33 in its left-hand position by adjusting the tap on T1S and let the computer rebalance. Note the resulting power $P_0$ and the resulting cost $F_A$.

(2) Open switch 32a and close switch 32b to put this section of the computer on manual. Eliminate the cost increment at switch 33 and move the computer by adjusting knob K2, increasing the power setting through adjustment of K2 until the cost $F_A$ reappears on the cost meter A2. The power at this point is called $P_B$.

(3) For a sale increment $P_B-P_0$ the incremental cost is $F_A$.

(4) Repeat for as many other points as desired.

If a station is on a stop, that shaft can be treated simply as a tie line shaft as described above, the incremental cost being indicated on the corresponding cost meter such as A2. Thereafter, proceed as for a tie.

The servo amplifiers referred to in the discussion relating to FIG. 5 are conventional electronic amplifiers. A suitable type of amplifier is illustrated in FIG. 6. This amplifier consists of a four stage capacitor coupled linear preamplifier, comprising the dual triodes V1 and V2, which amplifies the input signals applied to the input grid circuit 34. The output of the preamplifier is applied to the control grid 35 of a power amplifier V3 having approximately unity gain. By way of illustration, servomotor S1S is illustrated as being controlled by this amplifier. The fixed field winding FS1 is again excited with alternating-current from any suitable source, while the control field winding CS1 is connected in the cathode circuit of the power amplifier tube V3. It will be noted from this amplifier, since all the plate circuits are energized with direct-current applied between conductor L3 and ground, that the phase of the voltage applied to the grid circuit 34 of tube V1 with respect to the phase of the alternating-current voltage applied to the fixed field FS1 determines the phase relation of the exciting current for the control field CS1, by which the motor may be caused to operate in either rotational direction.

The arrangement shown in FIGS. 8a through 8h illustrates a preferred embodiment of this invention. The organization of these figures to make up the complete circuit is shown in FIG. 7. This circuit embodies computing features applicable to typical situations found in the average electric power system and, to this extent, is an elaboration on the circuit disclosed in FIG. 5. The computer circuit of FIGS. 8a through 8h is directly applicable to the electric power system illustrated in FIG. 1 of these drawings, and, hence, provides arrangements for computing the station powers and includes arrangements representing the tie powers existing in the economic dispatch equations defining the power system of FIG. 1.

The loss equation for this electric power system, considering all the power square terms and the cross product terms for all of the power points or power connections in the system is $$L = P_1^2 B_{11} + 2P_1 P_2 B_{12} + P_2^2 B_{22} + 2P_2 P_3 B_{23} + P_3^2 B_{33}$$
$$+ 2P_3 P_4 B_{34} + P_4^2 B_{44} + 2P_4 P_5 B_{45} + P_5^2 B_{55} + 2P_1 P_3 B_{13}$$
$$+ 2P_1 P_4 B_{14} + 2P_1 P_5 B_{15} + 2P_2 P_4 B_{24} + 2P_2 P_5 B_{25} + 2P_3 P_5 B_{35}$$

from which the incremental losses with respect to the stations and ties become:

Tie #1 $\frac{\partial L}{\partial P_1} = 2P_1 B_{11} + 2P_2 B_{21} + 2P_3 B_{31} + 2P_4 B_{41} + 2P_5 B_{51}$ Station #2 $\frac{\partial L}{\partial P_2} = 2P_1 B_{12} + 2P_2 B_{22}$
$$+ 2P_3 B_{32} + 2P_4 B_{42} + 2P_5 B_{52}$$

Tie #3 $\frac{\partial L}{\partial P_3} = 2P_1 B_{13} + 2P_2 B_{23} + 2P_3 B_{33} + 2P_4 B_{43} + 2P_5 B_{53}$ Tie #4 $\frac{\partial L}{\partial P_4} = 2P_1 B_{14} + 2P_2 B_{24} + 2P_3 B_{34} + 2P_4 B_{44} + 2P_5 B_{54}$ Station #5 $\frac{\partial L}{\partial P_5} = 2P_1 B_{15} + 2P_2 B_{25}$
$$+ 2P_3 B_{35} + 2P_4 B_{45} + 2P_5 B_{55}$$

Here again the equations are based on the assumption that economic dispatch exists when the incremental delivered power cost to the equivalent load center of the system, for a base case, from all variable stations is the same. Again, in these equations, the power losses are charged on the basis of the delivered power cost. For easy reference, the general equation for determining delivered power cost is given below:

$$\frac{dF}{dP} + 2\lambda \Sigma PB = \lambda$$

where for the stations:

$F$=production cost for a given station.
$P$=power generated by the given station.
$B$=coefficients of the power-form loss formula representing system power losses with respect to the equivalent load center.
$\lambda$=incremental delivered power cost with respect to the equivalent load center of the system for each of the variable stations.

and for the ties:

$$\frac{dF}{dP}$$

represents the worth of power at a tie. In the computer this is determined from the quantity $(\lambda - 2\lambda\Sigma PB's)$ which equals $$\frac{dF}{dP}$$

for a tie. With respect to the ties, B and $\lambda$ have the same meaning as for a station. The economic dispatch equations are:

Tie #1 $\frac{dF_1}{dP_1} + 2\lambda(P_1 B_{11} + P_2 B_{21}$
$$+ P_3 B_{31} + P_4 B_{41} + P_5 B_{51}) = \lambda$$

Station #2 $\frac{dF_2}{dP_2} + 2\lambda(P_1 B_{12} + P_2 B_{22}$
$$+ P_3 B_{32} + P_4 B_{42} + P_5 B_{52}) = \lambda$$

Tie #3 $\frac{dF_3}{dP_3} + 2\lambda(P_1 B_{13} + P_2 B_{23}$
$$+ P_3 B_{33} + P_4 B_{43} + P_5 B_{53}) = \lambda$$

Tie #4 $\frac{dF_4}{dP_4} + 2\lambda(P_1 B_{14} + P_2 B_{24}$
$$+ P_3 B_{34} + P_4 B_{44} + P_5 B_{54}) = \lambda$$

Station #5 (5L) (Unit L) $\frac{dF_L}{dP_L} + 2\lambda(P_1 B_{15}$
$$+ P_2 B_{25} + P_3 B_{35} + P_4 B_{45} + P_5 B_{55}) = \lambda$$

Station #5 (5H) (Unit H) $\frac{dF_H}{dP_H} + 2\lambda(P_1 B_{15}$
$$+ P_2 B_{25} + P_3 B_{35} + P_4 B_{45} + P_5 B_{55}) = \lambda$$

Assuming that Station #2 is variable and that both Unit L and Unit H of Station #5 are variable, the equations which figure in the system Economic Dispatch are:

(2) $\frac{dF_2}{dP_2} + 2\lambda(P_1 B_{12} + P_2 B_{22} + P_3 B_{32} + P_4 B_{42} + P_5 B_{52}) = \lambda$ (5L) $\frac{dF_L}{dP_L} + 2\lambda(P_1 B_{15} + P_2 B_{25} + P_3 B_{35} + P_4 B_{45} + P_5 B_{55}) = \lambda$ (5H) $\frac{dF_H}{dP_H} + 2\lambda(P_1 B_{15} + P_2 B_{25} + P_3 B_{35} + P_4 B_{45} + P_5 B_{55}) = \lambda$ The computer system of FIG. 8 is designed to solve the Economic Dispatch equations for the power system, taking into account all of the loss terms which are involved in the equations. To this end, the computer system comprises separate servo sections, one for each of the identified power points $P_1$ through $P_5$ in the power system of FIG. 1, together with special servo arrangements for handling the special problems existing with regard to Tie #3, Tie #4 and Station #5.

Usually the tie power in a system is some fixed value which is known or which can be conveniently determined, based on the generating capabilities of the system. Since tie power is fixed, and since a tie usually does not involve an incremental cost curve, it is convenient to represent tie power by some suitable fixed voltage, which may be tapped from a potentiometer. Since tie power may be either positive or negative, depending upon whether power is entering the system from an adjoining power system or leaving the system to help carry the load in the adjoining system, provision is made in this arrangement for representing either positive or negative tie powers by suitable voltages of reversible phase.

As in the case of FIG. 5, the system herein disclosed operates on alternating-current, for example, it may be energized with 60 cycle alternating-current. Since alternating-current is employed throughout the system, it is necessary to properly phase all of the element voltages and currents relating to the quantities involved in the various equations in order to properly simulate the conditions in the electric power system. In a general sense, all of the servos depend for their operation upon a voltage generated in a $\lambda$ servo generally designated $\lambda$S, which produces oppositely phased output voltages which, for an instant half-cycle of alternating-current, may be designated $+\lambda$ and $-\lambda$, as shown. These $\lambda$ voltages are applied to each servo section of the system to energize the $\lambda$ potentiometers associated with each servo section, whereby the voltages $+\lambda$P and $-\lambda$P for the respective servo sections are generated and applied as energizing voltages or currents to the respective B coefficient potentiometers illustrated in the five-by-five array of potentiometers in FIG. 8e.

The power supply for the system is a transformer generally designated T4 (see FIG. 8d), having a primary winding adapted for connection to a conventional supply of alternating-current and having a multi-tapped secondary winding, the center tap of which is grounded. Thus, the voltages on opposite sides of the center tap with respect to ground, for a given instant half-cycle of alternating-current, are of opposite phase and to indicate this condition, the end terminals of the secondary winding have been designated $+$ and $-$. The secondary winding is provided with a plurality of taps which, in this case, may be equal voltage taps on the negative side of the ground connection, which are designated V1, V2, V3, V4, V5 and V6. Similarly, on the positive side of the grounded center tap, the corresponding voltage taps are designated V7, V8, V9, V10, V11 and V12. Thus, for any voltage tapped from this transformer and applied in the system and connected to corresponding tap points on opposite sides of the grounded center tap, the midpoint of the voltage between these points, for example, points V6 and V7, will correspond to ground, and any voltage on either side of the center, with reference to other voltages in the system, will for that half-cycle be either positive or negative voltages with respect to ground.

With these considerations, more specific reference to the $\lambda$ servo and with particular reference to the transformer $\lambda$T, it will be seen that both of the voltages $+\lambda$ and $-\lambda$, as indicated at the $+\lambda$ and $-\lambda$ conductors, will be momentarily positive and negative with respect to the grounded center tap of the secondary winding $\lambda$TS of the $\lambda$ transformer. The primary winding $\lambda$TP of this transformer is illustrated as having an adjustable tap driven by the $\lambda$ servomotor generally designated $\lambda$S. As in the case of FIG. 5, this motor is a two-phase motor having a fixed field winding F$\lambda$S connected across the supply of alternating-current generally designated by conductors X and Y and having a control field winding C$\lambda$S controlled by the output of $\lambda$ amplifier $\lambda$A. While the $\lambda$ transformer $\lambda$T is illustrated as having an adjustable tap, it will be appreciated that any suitable type of adjustable transformer, including those having rotating windings, may be utilized herein to produce the $+\lambda$ and $-\lambda$ voltages. The $\lambda$ servo, in addition to driving the adjustable tap along the primary of the $\lambda$ transformer, also actuates a dial generally designated $\lambda$D which is calibrated to indicate the incremental delivered power cost for the system either in dollars per megawatt-hour or in mills per kilowatt-hour.

The $\lambda$ servo is controlled by means of a manually operated potentiometer controlled by the dispatcher. This potentiometer, which is designated $-\lambda$P, actually generates a value of voltage designated $-\lambda$. This potentiometer is connected between tap V1 on transformer T4 and ground, whence any point over its range is negative with respect to ground for the half-cycle of alternating-current being considered. As will be described at a later point, this adjustment of the potentiometer by the dispatcher actually represents total power, since the dispatcher, while adjusting this voltage, watches the dial PMD of the power metering servo PMS which, at the time of this adjustment is connected to measure system total power as will be described at a later point. Thus, the power meter servo drives the dial to indicate the total power of the system including all variable stations, fixed stations and tie point powers.

The electrical quantity $-\lambda$, which is tapped from the total power potentiometer $-\lambda$P, is compared with a feedback voltage $+\lambda$ derived, from the output of the $\lambda$ servo, in the input circuits of the $\lambda$ amplifier $\lambda$A. Hence, when these electrical quantities are in equilibrium, the $\lambda$ servo stops.

Considering now the respective servos of the computer, the Tie #1 servo T1S (see FIG. 8a) comprises a two-phase motor having a fixed field winding FT1 connected to the supply of alternating-current designated by conductors X and Y and a control field winding CT1 having one side connected to ground and the other side connected to the output circuit of amplifier T1A. It may be well to refer again, at this point, to the fact that the servo amplifiers may be of any suitable conventional type, one such type having been previously described in connection with FIG. 6.

Since the power at a tie is assumed to be fixed, and since the tie does not ordinarily have an incremental cost curve, the tie power may be manually set in by the dispatcher. This is accomplished by means of a linear potentiometer generally designated FP$_1$, which is connected between the corresponding voltage taps V3 and V10 on the power supply transformer secondary. Thus, the electrical midpoint of this potentiometer corresponds to ground potential, and since the amplifier is connected between the tap of this potentiometer and ground, the tapped voltage is always referred to ground and will, therefore, be reversible in phase, depending upon which side of the electrical center of the potentiometer the tap is positioned. Thus, the phase of excitation of winding CT1 due to the output of the servo amplifier T1A is reversible with respect to the phase voltage of the fixed field winding FT1, so that the servomotor for Tie #1 is reversible in operation.

A feedback voltage is derived from a linear power potentiometer PP$_1$, which is also connected between points V3 and V10 of the power transformer secondary. The electrical connection of potentiometer PP$_1$ is such that a voltage of opposite phase with respect to that tapped from FP$_1$ is tapped from this potentiometer. This voltage is fed back to the input of the servo amplifier T1A and causes the servomotor to stop at such plifier and causes the servomotor to stop at such time as these oppositely phased voltages are equal in magnitude. The power indication at the tap of potentiometer PP$_1$ now corresponds to that which has been set in at the manual potentiometer FP1 and, hence, indicates the power at the tie.

The potentiometers T1$a$ and T1$b$ associated with servo T1S are each connected across the $+\lambda$ and $-\lambda$ conductors and are so arranged that for tap movements in the same physical direction from their electrical centers, which correspond to ground potential equal voltages of opposite phase are developed. Since the rotation of the servomotor shaft is a function of power, it will be appreciated that the voltage, and hence the current tapped from each of these potentiometers, is expressable in terms of the product of $\lambda$ and the instant power value. Hence, the current from λ potentiometer T1a is designated ∓λP₁ and the current tapped from potentiometer T1b may be represented at ±λP₁. These currents are applied to the parallel connected B coefficient potentiometers $B_{12}$, $B_{15}$, $B_{13}$, $B_{14}$, $B_{11}$ as indicated in FIG. 8e. The taps of all these B coefficient potentiometers are adjusted to a value corresponding to twice the value of the corresponding self or mutual system resistances corrected for the scale factor of the computer. Thus, the output tapped from these B coefficient potentiometers becomes, for a general case, 2λΣPB.

A simple comparison bridge, of conventional nature and not shown, is utilized to calibrate the "B" potentiometers. The potentiometers are connected one at a time into the comparison bridge. The bridge dial is then set to the desired value for that potentiometer, as determined from previous calculations of the "B" coefficients from power system studies for the base case, and the "B" potentiometers adjusted until a null meter reads zero indicating that the bridge is balanced and the potentiometer has the desired setting. The potentiometer is then locked at this setting and the process is repeated for the remaining potentiometers. The self "B" coefficients are always positive but the mutual "B" coefficients may be either positive or negative as determined from the system studies. Since the λ potentiometers for Tie #1 are connected across the +λ and —λ conductors which are equal voltages of opposite phase with respect to ground and since the taps of the λ potentiometers always tap equal voltages of opposite phase therefrom, the electrical centers of the "B" potentiometers for Tie #1, excited by the λP₁ current, are always at ground potential for either phase of the λP₁ voltage with respect to the instant phase of the +λ to —λ voltage produced at the secondary λTS of the λ transformer λT.

Thus for a given instant phase of the +λ to —λ voltage, which is the reference phase and which, for example, the phase of the voltage tapped from the λ potentiometers T1a and T1b is such as to make the right terminal of the "B" potentiometers, $B_{12}$, $B_{15}$, $B_{13}$, $B_{14}$ and $B_{11}$, positive and the left side negative, positive values of the B coefficients may be tapped from the right side of these "B" potentiometers between their electrical centers (ground potential) and the positive terminals, and negative values from the left side. Thus the sign of the "B" coefficients may be established. This sign of the B coefficients remains for either phase of the λP₁ voltage between the taps of the λ potentiometers T1a and T1b since it is determined by the reference voltage, +λ to —λ.

With a positive "B" coefficient setting and with the voltage between the taps of λ potentiometers T1a and T1b such as to make the right terminal of potentiometer $B_{12}$, for example, positive and the left terminal negative, a positive incremental cost of loss current $2\lambda P_1 B_{12}$ is tapped at potentiometer $B_{12}$. This is the condition which represents tie power flow into the system. For tie power flow out of the system the setting of the λ potentiometers T1a and T1b is reversed reversing the phase of the voltage at the taps of T1a and T1b with respect to the reference phase, +λ to —λ. This reversal of the λP₁ current with a positive B coefficient results in a negative current $-2\lambda P_1 B_{12}$ for the incremental cost of power loss.

If a negative value is selected for the mutual "B" coefficients for Tie #1, $B_{12}$, $B_{15}$, $B_{13}$, $B_{14}$, then the setting of the taps of λ potentiometers T1a and T1b for tie power flow into the system results in a negative current $-2\lambda P_1 B_{12}$ at potentiometer $B_{12}$. Conversely setting of potentiometer T1a and T1b for tie power flow out of the system results in a positive current $2\lambda P_1 P_{12}$ at potentiometer $B_{12}$ for the incremental cost of power loss.

This discussion applies equally to the parallel connected "B" coefficient potentiometers for Ties 3 and 4.

Since the power flows at the stations are not reversible it is not necessary to reverse the phase of the voltages tapped from the station λ potentiometers. Referring to Station #2, the λ potentiometers S2a and S2b are respectively connected between —λ and ground +λ and ground. The phase of the voltage tapped from the potentiometers S2a and S2b always results in a positive right terminal of potentiometer $B_{22}$ and a negative left terminal for the indicated phase of the +λ to —λ voltage. Thus positive "B" coefficients are tapped from the right side and negative from the left. Since this potentiometer $B_{22}$ represents self coefficients only, the "B" coefficient setting will always be made on the right side thereof to obtain positive values, as previously noted. The remaining potentiometers $B_{25}$, $B_{23}$, $B_{24}$ and $B_{21}$ may be set positively or negative as required, being mutual "B" coefficient potentiometers.

This discussion applies equally to the parallel connected "B" coefficient potentiometers for Station #5.

Depending upon the specific conditions, anywhere from one to three electrical quantities, 2λΣPB, may be required from each of the B coefficient potentiometers. Thus, to minimize loading effects, parallel circuits are taken from the respective taps as required. For Tie #1, for example, only one such quantity is required and this, instead of being used for controlling the Tie #1 servo, is used for metering purposes. This is true also of Ties #3 and #4, but by reason of the treatment of Ties #3 and #4, parallel connections are taken from the taps. However, for the station servos, one parallel tap from the B coefficient potentiometer is required for metering and the other parallel tap is required as a servo control quantity to introduce the loss factor into the Economic Dispatch equation being handled by the computer.

The power loss cost terms for the power at Tie #1 are derived from the taps of respective B coefficient potentiometers $B_{11}$, $B_{21}$, $B_{31}$, $B_{41}$ and $B_{51}$. These taps are all connected in parallel and the loss terms are indicated adjacent the respective taps. These currents are algebraically combined in parallel to produce the complete incremental cost of power loss expression identified in the Economic Dispatch equation for Tie #1 and indicated in the drawings in FIG. 8e. Each of the groups of parallel connected B coefficient potentiometers are energized with their corresponding λP electrical quantities derived from the respective +λ and —λ potentiometers for the respective servo sections to produce the proper B coefficient characteristics in the respective circuits. The calibration of these potentiometers is the same as that described in connection with Tie #1 and will be understood on that basis.

Station #2 servo S2S computes the Economic Dispatch power for variable Station #2. Since this station is a variable station, it requires an incremental cost curve, and consequently, is provided with a non-linear station potentiometer assembly generally designated SP₂. This potentiometer, as described in connection with those of FIGS. 4 and 5, is a conventional linear potentiometer in which fixed tapped portions are shunted by resistors of differing magnitudes to produce a cost curve comprising a plurality of straight line sections. A diagrammatic illustration of one practical arrangement of such a potentiometer is illustrated in FIG. 9, wherein provision is made through a cost factor adjustment for recalibrating the potentiometer for different fuel costs at the station and for changing the characteristic of the potentiometer for changes in the thermal efficiency of the station resulting from the combination of different station generating units with respect to the base case for which the potentiometer assembly was designed. This assembly, while designated SP₂ for identification with the assembly associated with station servo S2S, is applicable to the assemblies $SP_L$ and $SP_H$ associated with servos ULS and UHS forming part of the station servo section representing Station #5.

In this assembly, the linear potentiometer is identified

LP₂ and is provided with an adjustable tap LPT for the base case. The cost curve switch generally designated CCS, and which comprises the nine mechanically ganged switch sections illustrated, selects any one of five different relationships between station production cost and power. The non-linear relationships are achieved by the respective groups of resistors connected between the conductors V11 and V9 and which are respectively connected across the spaced taps of the linear potentiometer. The respective resistor groups are identified R1, R2, R3, R4 and R5. Only the connections for group R1 are shown in the interest of wiring simplicity, it being understood that corresponding taps on the remaining switches are correspondingly connected to the terminals of the remaining resistors of the respective groups. This is illustrated in connection with the bottom switch section. The potentiometer is mounted on the shaft of the servomotor so that the position of the potentiometer sliding contact is proportional to station power and the ten taps correspond to 10, 20, 30, etc. percent of full power. If the potential at each tap is proportional to the station cost at the corresponding percent power, the output voltage of the potentiometer will represent the station cost curve by ten straight line sections. External resistors connected between the taps, that is, the resistors of the respective groups R1 through R5, fix the tap potentials at the values necessary to represent the cost curve at least as accurately as the cost data can be computed. The cost curve switch CCS connects the ten taps to any of the five groups of resistors. Obviously, if more cost curves are needed than represented in the five selections provided herein, these may be added in the manner illustrated. The cost factor rheostat CF2 is used as a multiplier on the cost curves to quickly adjust them for changes in the cost of fuel and for differences between summer and winter efficiency, for example. As will be described at a later point, this is suitably calibrated over a range of factors from fractional values of the base case to values greater than unity with respect to the base case and can be located in any given position. It varies the rheostat to modify the effect of a given voltage from the tapped potentiometer. As illustrated in the schematic for station servo S2S, the potentiometer assembly SP₂ is connected across taps V9 and V11 on the secondary of the power supply transformer T4. Thus, with respect to ground, any tapped voltage from this potentiometer for this half-cycle will be momentarily positive. This is based on the condition that the power at a station is always treated as positive.

From the foregoing explanations relating to the station potentiometer, it will be appreciated that for any particular point of the adjustable tap on the linear potentiometer, an incremental cost factor $$\frac{dF_2}{dP_2}$$

as indicated adjacent the circuit connected with the tap, will be produced, assuming that the tap position is a function of the station power. The tap of this potentiometer, as well as the station power potentiometer PP₂ and the respective λ potentiometers S2a, S2b, together with the station power dial P₂D, are driven by the output of the station servomotor, which again is a two-phase motor having a fixed field winding FS2, energized across the alternating-current conductors X and Y and a controllable field winding CS2 connected between the output of servoamplifier S2A and ground. The input to the servo amplifier S2A is the algebraic sum of incremental production cost $$\frac{dF_2}{dP_2}$$

the incremental cost of power loss term $$2\lambda(P_1B_{12}+P_2B_{22}+P_3B_{32}+P_4B_{42}+P_5B_{52})$$

and $-\lambda$ derived from adjustment at the $-\lambda$ potentiometer $-\lambda$P. When the sum of these quantities is equal to zero, the Economic Power Dispatch equation for the station is satisfied and the servo comes to rest. At this position, the station power is indicated by the electrical quantity tapped from the power potentiometer for the station PP₂. The λP terms are tapped from the adjustable taps of the λ potentiometers S2a and S2b. The current resulting from the $+\lambda P_2$ and $-\lambda P_2$ quantities at these taps circulates in parallel through the respective B coefficient potentiometers $B_{22}$, $B_{25}$, $B_{23}$, $B_{24}$ and $B_{21}$ in the vertical array associated with Station #2 in FIG. 8e.

It will be noted that a switch 2S is provided in the input circuit to the amplifier S2A. This is a double pole, double throw switch operated between Fixed and Variable station positions, so identified in the drawing. When the switch is in the Variable position, the terms of the equation as generated on the station potentiometer SP₂ and the "B" coefficients previously referred to, together with $-\lambda$ are combined in the input of the amplifier to produce an indication of the Economic Dispatch of power from that station. However, if the station is operating at a limit, either an upper or a lower limit, depending upon the requirements of that station for the particular area which the station services, or if for any other reason the station is to be regarded as a fixed station, the switch is moved to the fixed position. In the fixed position the circuits through which the terms of the Economic Dispatch equations are applied are open and a circuit connected to a fixed station potentiometer FP₂ is completed. The fixed station potentiometer is energized with voltage derived between tap V6 and ground giving a momentarily negative power quantity. Potentiometer PP₂ is connected between tap V7 and ground on the secondary of the power transformer producing a momentarily positive power quantity. Thus, the respective voltages tapped from potentiometers PP₂ and FP₂ are oppositely phased, the differential being applied through the switch 2S to the input of the amplifier. Thus, the servomotor repeats the manually adjusted voltage representative of fixed station power, converting it to a momentarily positive voltage or current, $+P_2$, having the proper phase relation for combination with other voltages or currents similarly derived, to meter the total power of the system, for example. Inasmuch as an incremental cost quantity is needed for both computing and metering functions in connection with Station #2 servo, two cost factor rheostats are shown, one in each of the two branches. These are each designated CF2 and the taps of these potentiometers are mechanically ganged and controlled from a single knob CFK. The consideration here resulting in the use of two rheostats, is simply that of loading and corresponds to the considerations stated before in regard to the loading of the "B" coefficient potentiometer circuits. In the event that only a single outlet connection is required, it will be appreciated that a single cost factor potentiometer, such as that designated CF2 in FIG. 9 will be sufficient. Similarly, if the loading problem is of a minor nature, a single potentiometer may suffice. The connection of the λ potentiometers of station servo S2S differs from that illustrated for the Tie #1 servo T1S. As previously described in Tie #1 servo the two potentiometers are connected between the $+\lambda$ and $-\lambda$ voltages, and consequently, their center points correspond to ground. This, in effect, forms an electrical bridge network, whereby the taps of the potentiometers as driven by the servomotor seek corresponding points on opposite sides of ground potential as a function of the power input quantity providing for positive or negative power factors in the expression defining the incremental cost of power loss, depending on whether power is entering or leaving the system, respectively. However, in the case of the station servo, since station power is always regarded as positive, the potentiometer connection is different, preventing reversal of the voltage between the potentiometer taps. For this reason, the respective potentiometers are connected between $+\lambda$ and ground and $-\lambda$ and ground.

The representation of a tie with a large load or with an adjoining power system, involving more than one interconnection or tie with the power system under consideration, is represented by means of Ties #3 and #4 in FIG. 1 and by tie servo sections T3S and T4S in FIG. 8. The power interchange at each of these connections is represented by $P_3$ and $P_4$, the sum of which is transmitted to or received from the adjoining power system. The treatment of these tie points with the power system in question corresponds to that used in connection with Tie #1, but since the powers involved in the ties are associated with a single load or power system, it is feasible to visualize this as a connection requiring a total transfer of power, either into or out of the system in question, in which the respective tie points with the system in question are to carry certain percentages of the total power involved.

For this reason, a total tie power potentiometer $FP_{3,4}$ is connected across the power transformer secondary taps V3 and V10, providing equal voltages of opposite phase with respect to ground, the electrical center of the total tie power potentiometer corresponding to ground potential for the system. Individual tie power potentiometers $FP_3$ and $FP_4$ are connected in parallel between ground and the tap of the total tie power potentiometer $FP_{3,4}$. The dispatcher sets the total tie power either positive or negative, depending upon the direction of power interchange at the interconnection and thereafter sets the individual tie powers on potentiometers $FP_3$ and $FP_4$ for the respective tie power values, the sum of which equals the total tie power which has been established. The respective voltages tapped from the tie potentiometers are applied as input to respective servo amplifiers T3A and T4A, which control the respective servomotor control fields CT3 and CT4 connected between the outputs of the respective amplifiers and ground. The respective servomotor sections T3S and T4S again comprise two-phase servomotors having respective fixed fields FT3 and FT4 energized by alternating-current represented in conductors X and Y. Again assuming that the tie powers are fixed and that there is no incremental cost curve for the respective ties, each tie power is represented in a servo driven potentiometer, specifically by potentiometers $PP_3$ and $PP_4$, each of which is connected between power transformer secondary taps V5 and V8, in the manner described in connection with Tie #1 servo, to obtain respective 180° out-of-phase feedbacks from the respective tie power potentiometer taps to the inputs of the respective servo amplifiers to null the amplifiers at such time as the servo driven power potentiometers have a tap voltage corresponding to the manually set tie voltages at potentiometers $FP_3$ and $FP_4$, respectively.

The $\lambda$ potentiometers T3a, T3b and T4a, T4b for the respective servo sections are connected, as described in connection with Tie #1 servo, in inverse parallel relation across the $+\lambda$ and $-\lambda$ conductors to produce the $\lambda P$ quantities introduced to the parallel connected "B" coefficient sections in the "B" coefficient group. These are respectively identified in the vertical parallel groups designated Tie #3 and Tie #4. Thus, the incremental cost of power losses with respect to Ties #3 and #4 are introduced into the system from which the respective loss terms $$2\lambda(P_1B_{13}+P_2B_{23}+P_3B_{33}+P_4B_{43}+P_5B_{53})$$
and
$$2\lambda(P_1B_{14}+P_2B_{24}+P_3B_{34}+P_4B_{44}+P_5B_{54})$$

are produced. Parallel branches of these respective loss expressions are taken from each of the "B" coefficient networks from which these terms are derived. In each case, one is fed to a corresponding section of the metering arrangement yet to be described and the other of each is applied as input to the corresponding one of amplifiers 3A and 4A associated with the respective servo sections. These amplifiers are not illustrated in detail herein, but may be any conventional type of amplifier for amplifying these input voltages or currents. The output currents of the amplifiers are combined in parallel as shown so that the total cost of the power loss may be combined for metering purposes.

In considering the problems presented by a station such as Station #5 diagrammatically illustrated in FIG. 1, it is necessary to provide separate servo units in the computer to accommodate the differing thermal efficiency characteristics upon which the cost curves of the respective generating units in the station are based. It will be recalled from earlier discussions relation to FIG. 1 and with regard to Station #5, that the respective generating units involve low pressure and high pressure steam-electric generating arrangements. The efficiency characteristics of these units being incompatible, require separate representation. In the computer, two station potentiometer assemblies are used, one for each unit, to represent the respective incremental production costs. These station potentiometer assemblies are employed with individual servos for computing the economic dispatch for the separate units from which the unit generations may be determined. Thereafter, the unit generations may be combined to give the total value of generated power for the station.

In the arrangement illustrated herein, this is accomplished in the provision of respective low pressure and high pressure servo sections for the respective units. These are designated ULS and UHS. Since both of these units are located in the station and have essentially the same point of interconnection with the power transmission system, their power losses may be determined from the total power of the station since they may be regarded as having a common power point in the system with respect to the equivalent load center of the system for the base case. Thus, a separate servo is provided which is responsive to the combined power generations derived in the respective low and high pressure servo sections and utilized to compute the $\lambda P$ factors forming part of the loss expression for the station as a whole.

The low pressure servo ULS comprises a two-phase motor having a fixed field winding FUL energized across conductors X and Y and a control field winding CUL connected between the output of servo amplifier ULA and ground. Only two potentiometers are driven by the low pressure servomotor, one is the station incremental production cost potentiometer $SP_L$ energized across the power transformer secondary taps V8 and V10 and the other of which is the station power potentiometer $PP_L$ energized between the power transformer secondary tap V5 and ground. It will be noted in this case that the power quantity developed at the station power potentiometer $PP_L$ is momentarily negative as distinguished from the momentarily positive value derived at the power potentiometer $PP_2$ for Station #2. Similarly, the high pressure servo UHS comprises a two-phase motor having a fixed field FUH energized across alternating conductors X and Y and a control field CUH connected between the output of servo amplifier UHA and ground. The incremental production cost potentiometer for the high pressure generating unit is generally designated $SP_H$ and is energized between the power transformer secondary connections V9 and V10. The power potentiometer, which is also driven by the servomotor, is designated $PP_H$ and is connected between power transformer secondary tap V4 and ground to also produce a momentarily negative power voltage.

Both of these negative power voltages $-P_L$ and $-P_H$ are combined in parallel in the input to servo amplifier S5A of station servo S5S. Thus, this amplifier is responsive to the sum of the respective powers determined for the low pressure and high pressure units and is further controlled by feedback of a momentarily positive power voltage, $P_5$, also used for metering, which is derived from the tap of Station #5 power potentiometer $PP_5$ connected between power transformer secondary tap V9 and ground. Station #5 servomotor comprises a fixed field FS5, energized across alternating-current conductors X and Y and a control field CS5 connected between the output of amplifier S5A and ground. Servomotor S5S also drives the λ potentiometers S5a and S5b which are respectively connected between the +λ and —λ conductors and ground. The taps of these potentiometers, therefore, tap respective voltages as a function of the tap positions in accordance with the operation of the servomotor, which outputs are respectively designated $+\lambda P_5$ and $-\lambda P_5$. The currents resulting from the differential voltages tapped at the λ potentiometers of the Station #5 servo are applied to the Station #5 vertical array of "B" coefficient potentiometers, from which the cost of the power losses associated with the total power $P_5$ produced by Station #5 appearing in the respective loss expressions of the Economic Dispatch equations are derived. In each instance, power dials are provided to indicate the power magnitudes involved. For the low pressure unit this dial is designated $P_LD$, for the high pressure unit the dial is designated $P_HD$, and for the station total power the dial is designated $P_5D$.

All of the power quantities tapped as currents from the respective power potentiometers for the ties and for the stations are algebraic combined in a common circuit producing a total current represented by $$P_1+P_2+P_3+P_4+P_5$$

as indicated in FIG. 8g. Through suitable metering connections, yet to be described, during adjustment of the computer by the dispatcher for economic dispatch for a new power load on the system, this total power current is applied as input to the power metering servo amplifier generally designated PA, the output of which controls the control field CPM of the two-phase servomotor, connected between the output of amplifier PA and ground. The fixed field of this servomotor is reversibly connected across the alternating-current power supply conductors X and Y through suitable switching circuits in the metering system to provide for reversing the phase of the fixed field. This is necessary to accommodate the computed power quantities for both stations and ties. It will be recalled that in certain instances tie powers may be negative for situations when power is being sold to an adjoining power company. Similarly, in connection with the unit servos of Station #5, negative powers are generated on the respective power potentiometer so that the total station power may be produced as a positive value on power potentiometer $PP_5$, as previously described.

A cost metering servo CMS is also provided and arrangements made through the metering system so that the cost of power at a tie, the cost of delivered power and station production cost may be metered. The cost metering servo includes a two-phase motor having, a control field CCM and a fixed field FCM, which latter is reversibly connected across the alternating-current power supply conductors X and Y through the metering system. This is done for the reason set forth in connection with the power metering servo fixed field switching arrangement. The servo, in addition to driving the cost metering dial CMD which indicates the cost of power in terms of dollars per megawatt or mills per kilowatt as desired, drives the tap of a feedback potentiometer $CP_M$, which nulls the servo for a particular value of input at the input circuit of the cost metering servo amplifier CA.

The metering system involves an array of relays controlled from a suitable supply of direct-current represented in a full-wave rectifier 40, which is energized by the output of a transformer T5, the primary of which is energized across the alternating-current supply. The negative side of the full-wave rectifier is connected to the common ground for the alternating-current system and the positive side is utilized as input to the metering relay system.

The respective relays of the metering system are controlled by selected pairs of push buttons in respective vertical push button groups illustrated in FIG. 8h. The push buttons of the left vertical group are designated $0_L$, $1_L$, $2_L$ and in the right vertical group are designated $0_R$, $1_R$ and $2_R$. The relay coils, in addition to being indicated in their respective positions adjacent the contacts in the respective sections of the metering system, are also illustrated in the push button network for convenience of reference as to specific energization. The arrangement is such that for the nine relay coils illustrated, a total of only six push buttons are required to selectively control the nine relays instead of nine, as would be the case if one push button were provided for each of the relays. Although this savings may not appear large for the limited number shown here, in a practical arrangement involving a total of 100 relays only 20 push buttons are required, 10 on each side, which are selectively closed in pairs.

For example, if it is desired to pickup relay 00, push buttons $0_L$ and $0_R$ are operated. This completes an energizing circuit from the +D.C. conductor through the closed back contact of switch $0_L$ to conductor R0 through the coil of relay 00 to conductor P0 and through the closed back contact of relay $0_R$ to the ground conductor and the negative side of the full-wave rectifier 40. To energize relay 10, push button $1_L$ is actuated, which applies direct-current from the +D.C. conductor through the normally closed contacts of switch $0_L$ through the back contacts of switch $1_L$ to conductor R1 and then through the coil of relay 10 to conductor P0 through the back contacts of $0_R$, which are now closed, to ground and the negative side of the full-wave rectifier. Thus, selective closing of any two push button contacts on the left and the right side groups energizes the corresponding relay.

In operating the system, the dispatcher, knowing the total power requirement of the system, actuates push buttons $0_L$ and $0_R$ to energize the total power relay 00. This relay closes its contacts LPC and TPC and engages the normally open contact of the transfer set PRC. Closure of total power contacts TPC connects the total power current $P_1+P_2+P_3+P_4+P_5$ to the input of the amplifier of the power metering servo PMS. Thus, as the dispatcher moves the adjustable tap of the total power potentiometer $-\lambda P$ to change the value of λ applied in the system, he observes the total power indication set up on the power metering dial PMD by the power metering servo and continues adjusting the tap of the total power potentiometer until the power metering dial indicates the required total power of the system. At this point, the manual adjustment is stopped and the servo system ceases operation. Contact LPC of the total power relay energizes the light LP of the power metering servo indicating that this servo is presently in use. This contact connects the light between the direct-current supply circuit +D.C. and ground, as shown. Relay D, which is now deenergized establishes the proper instantaneous phase excitation of the fixed field FPM of the power metering servo for metering total power. This is based on the premise that the total power current will always be positive, since at no time will there be sufficient negative power interchange at the system ties to result in a negative total power feedback quantity. For this reading, contacts FPC actuated by relay D remain in their normally closed position as shown to provide the proper phase connection for the fixed servomotor field with the power supply represented in conductors X and Y at the contacts.

Energization of the total power relay 00 also closes the normally open set of contacts of the transfer contacts BRC. This connects the coil of relay B directly to the +D.C. conductor. Energization of relay B closes contacts —λC and contacts ERC. Contacts —λC apply the —λ quantity to the input circuit of the cost metering amplifier. This, it will be recalled, is the incremental delivered power cost quantity. Thus, the incremental cost of delivered power for the system is applied as a negative input to the amplifier CA. Since this is a negative quantity, a positive feedback for nulling the cost metering servo is required. This is accomplished through closure of contacts ERC of the relay B, which energizes relay E, between +D.C. and ground G, the contacts FCC of which properly phase the excitation voltage for the fixed field winding FCM, while at the same time establishing the proper phase of excitation for the power cost potentiometer $CP_M$ by interrupting its connection with tap V1 on the negative side of the secondary of the power transformer and connecting it with V12 on the positive side. Thus, both the excitation and feedback voltages for metering the incremental delivered power cost for the system are established.

Metering of power at Tie #1 and the worth of available power at Tie #1 is accomplished by energizing relay 01. To do this, switches $0_L$ and $1_R$ are operated, which connects the coil of relay 01 between the power conductors R0 and P1. This closes contact L1C, which energizes light L1 at the Tie #1 servo location which indicates the point being metered. Contacts $01a$ and $01b$ are closed, which grounds conductors CM2 and CM3. Contact 1P closes, connecting the tap of power potentiometer $PP_1$ for Tie #1 to the power metering conductor PMC, which is connected to the input of power metering amplifier PA. The normally open contacts of the transfer set 1L now close, connecting the cost of power lost quantity for Tie #1 to conductor L10. Normally, this quantity is grounded by the normally closed contacts of the transfer set 1L. Finally, contacts $01c$ close, which completes a partial energizing circuit for relay D which, it will be recalled, controls the phase of excitation applied to the fixed field FPM of the power metering servomotor. Completion of this circuit is accomplished by a manually operated switch 41 which must be operated by the dispatcher for metering different instantaneous polarities of power from ties or from the unit servos. Energization of the power metering conductor PMC by the electrical quantity $\mp P_1$ energizes the servomotor to indicate the power magnitude on the power metering dial PMD. This operation continues until the power quantity $\mp P_M$ tapped from the power metering potentiometer $PP_M$ corresponds to the input power quantity $\mp P_1$ and of opposite phase. The proper phase relation of this feedback power quantity is determined by contacts D1 of relay D which, in normally closed position, connects the power transformer secondary tap $V_1$ to the power metering potentiometer, and when in reverse position, closing the normally open contacts, connects the positive tap V12 of the power supply transformer to the power metering potentiometer.

To meter the worth of available power at Tie #1, as determined from the loss terms, the servo system and metering system provides for evaluation of the expression $$-[2\lambda(P_1B_{11}+P_2B_{21}+P_3B_{31}+P_4B_{41}+P_5B_{51})-\lambda]$$

This results in an indication of $$\frac{dF_1}{dP_1}$$

for Tie #1 which, it will be appreciated, is the remaining term of the expression defining the cost of power at Tie #1 from the Economic Dispatch equations.

To accomplish the determination of the cost of power at Tie #1, the dispatcher closes switch S1. This closes all three contacts of this switch, completing a circuit between conductors CM1 and T1, conductors T0 and BC and conductors T0 and AC at the respective switches. It will be noted that the circuit for the light LT associated with the cost metering switches is connected to the positive supply of direct-current through the normally closed transfer contacts BRC. However, the conductor CM1 is ungrounded during this operation and, therefore, a circuit for the light does not exist.

The connection of conductors BC and AC to the conductor T0, which is energized through the normally closed transfer contacts BRC by connection with the +D.C. conductor, picks up relays A and B. Energization of relay A closes the normally open contacts of the transfer set A1 connecting conductor L10 having the electrical quantity representative of power losses with respect to the power at Tie #1 thereon to the input of the cost metering amplifier CA. Energization of relay B closes contacts —λC which algebraically combines the —λ quantity with the incremental cost of power losses for Tie #1. The differential of this quantity appears in the amplifier input circuits running the servomotor which develops a corresponding quantity at the tap of potentiometer $CP_M$ to null the servo. At this point, the worth of available power at the tie is indicated on the cost metering dial CMD. Here again, relay E is energized through closing of contacts ERC which connects the coil of relay E between the +D.C. conductor and ground and relay E establishes the proper phase of excitation voltage for the fixed field FCM at its contacts FCC and establishes the proper phase voltage energizing the cost metering potentiometer $CP_M$ through closing of the normally open set of contacts of the transfer set E1. Thus, by the arrangements described, both the cost of power at Tie #1 and the magnitude of the power of Tie #1 are available at the dials CMD and PMD of the cost metering servo and the power metering servo, respectively.

Had an attempt been made to read the cost of delivered power at Tie #1, by closing the switch S2, conductor CM2 would have been connected to T1. Since conductor CM2 is grounded through switch $01b$ on relay 01, this would have completed a circuit for the light LT associated with the cost switches from +D.C. through contacts BRC of total power relay 00 to conductor T0, light LT and conductors T1 and CM2 to ground which would indicate to the dispatcher that an improper connection existed. Similarly, if station production cost were to have been selected for the tie by closing of switch S3, conductor CM3, which is now grounded through switch $01a$, would have been instrumental in lighting the light LT indicating the fuel cost at a tie could not be metered.

Metering of power at Station #2 together with other cost information at Station #2 is accomplished by energizing relay 02. To energize relay 02, switches $0_L$ and $2_R$ are closed, which completes an energizing circuit for the coil of the relay between conductors R0 and P2 across the D.C. supply. Energization of relay 02 closes contacts L2C, 1PC, 2P and connects the loss quantity circuit λΣ PB's (Station #2) associated with Station #2 to conductor L10 at transfer contacts 2L. Contacts L2C light the light L2 at the location of the Station #2 servo indicating the servo which is being metered. Contacts 1PC connect the incremental power cost quantity $$\frac{dF_2}{dP_2}$$

to the conductor DF. Contacts 2P connect the power quantity $+P_2$ to the power metering conductor PMC.

The power quantity $+P_2$ is connected by conductor PMC to the input of the power metering servo amplifier PA. Since this is a positive power quantity, the connections of the fixed field winding and the power metering potentiometer remain as indicated at contacts FPC and D1 with relay D deenergized. The power metering servo stops when the negative feedback term, in this case from the power metering potentiometer $PP_M$ equals and opposes the input quantity $+P_2$ to indicate the power at Station #2 on the power metering dial PMD.

Station production cost $$\frac{dF_2}{dP_2}$$

is metered by closing switch S3. This connects conductor CM3 to conductor T1 in the circuit for light LT, but since conductor CM3 is ungrounded at this time, the light is not energized, which indicates to the dispatcher that he may correctly read the incremental production cost at the station. Switch S3 also connects conductor T0 to conductor CC. Conductor T0 is connected to the +D.C. conductor through the normally closed contacts of the transfer set BRC of total power relay 00, while conductor CC connects with the coil of relay C, the other side of which is grounded to complete an energizing circuit for the coil of relay C. This closes contact C1, which connects the incremental production cost conductor DF to the input circuits of the cost metering servo amplifier CA. The fixed field winding FCM and the cost metering potentiometer $CP_M$ of the cost metering servo are connected respectively to the alternating-current supply and the momentary negative A.C. supply through the normally closed contacts FCC and E1 respectively, of relay E, which at this time is not energized. Thus, the servomotor windings are properly phased and the cost metering potentiometer is properly phased to provide the proper cost metering indication on the dial CMD of the cost metering servo.

If it is desired to meter the cost of delivered power for Station #2, switch S2 is actuated in place of switch S3. This connects conductor CM2 to T1, which does not light the light LT, since conductor CM2 is ungrounded, connects conductor T0 to conductor CC, and connects conductor T0 to conductor AC which, by reason of the normally closed contact of the transfer set BRC of total power relay 00, energizes both conductors CC and AC, to energize relays C and A, respectively. Energization of relay A connects the power loss conductor L10 to the input of the cost metering servo amplifier CA through closure of the normally open contacts of the transfer set A1, and energization of relay C connects the incremental power cost quantity for Station #2 through contacts C1 to the input of the cost metering servo. Thus, the two terms of the Economic Dispatch equation covering the incremental production cost and the incremental power loss cost are combined in the input to the amplifier CA. Since both of these terms are positive terms, or in any case, their sum will be positive, relay E remains deenergized, maintaining the connections of the normally closed contacts FCC and E1 for proper phasing of the servomotor and the power feedback quantity. The servo is nulled, in this case, when the quantity tapped from the cost metering potentiometer CPM, which in this case is representative of $-\lambda$, is equal to and instantaneously of opposite phase to the combined input cost quantities. The cost metering dial CMD now indicates the cost of delivered power for Station #2.

The worth of available power at Tie #3 is metered by energizing relay 10. This is accomplished by actuating switches $1_L$ and $0_R$, completing an energizing circuit for the coil of relay 10 between conductors R1 and P0. This closes contacts 10c, L3C, 10a, 10b, 3P and the normally open contacts of the transfer set 3L. Contacts 10a and 10b ground conductors CM2 and CM3 so that closing of either switches S2 and S3 will light the light LT to indicate improper cost metering. Contact 3P connects the power quantity $\mp P_3$ to the power metering conductor PMC and thence to the input of the power metering amplifier PA, while the now closed contacts of the transfer set 3L connect the power loss cost quantity to the loss conductor L10. Contact L3C of relay 10 energizes the light L3 located at the location of Tie #3 servo to indicate which servo is being metered and contact 10c establishes a partial energizing circuit for relay D between the +D.C. conductor and ground. The dispatcher must therefore determine in which direction the power interchange at Tie #3 exists, which will indicate whether switch 41 should be left open or closed. Thus, relay D is instrumental in setting up the proper phasing of the power metering servo for proper indication of the power interchange at Tie #3.

To meter the worth of the available power at Tie #3, switch S1 is closed. Since conductor CM1 is not grounded, in this case, through operation of contacts on relay 10, the indicating light LT remains out, indicating proper cost metering for the tie. However, conductors BC and AC are connected to conductor T0, which is connected to the +D.C. conductor through the normally closed contacts of the transfer set BRC. Thus, the cost of power losses with respect to Tie #3 is applied through the new closed contacts A1 to the input of the cost metering servo amplifier CA. Contacts ERC complete the energizing circuit to ground for relay E and contacts $-\lambda C$ apply the quantity $-\lambda$ to the input of the servo amplifier. The differential of the cost of power losses and the incremental delivered power cost $-\lambda$ is therefore the worth of available power at the tie, as previously explained in connection with Tie #1, and the feedback quantity tapped from potentiometer $CP_M$ nulls the servo at which time the cost metering dial CMD indicates the worth of power at Tie #3. Energization of relay E properly phases the cost metering servo, as previously described.

Similar considerations apply with respect to metering the power at Tie #4 together with metering the worth of available power at Tie #4. To energize the relay 11 to accomplish this, switches $1_L$ and $1_R$ are closed to complete the energizing circuit for relay 11 between conductors R1 and P1, which closes contacts 11c, L4C, 11a, 11b, 4P and the normally open contacts of the transfer set 4L. Contacts 11a and 11b ground conductors CM2 and CM3 to prevent improper cost metering with respect to the tie, as previously described. Contact L4C, when closed, energizes the light L4 located at the location of the Tie #4 servo to indicate which servo is being metered, while contact 11c completes a partial energizing circuit for relay D, which will be completed by manual operation of switch 41 by the dispatcher, as required, to meter the tie power. Contact 4P applies the tie power quantity $\mp P_4$ to power metering conductor PMC to operate the power metering servo, while contact 4L, now closed, applies the power loss cost quantity to the loss conductor L10 for cost metering. Here again, switch S1 must be actuated to meter power cost at Tie #4.

Total tie power is metered by energizing relay 12. This is accomplished by actuating switches $1_L$ and $2_R$ which completes an energizing circuit between conductors R1 and P2. Energization of relay 12 closes contacts LAC, 12c, 12a, 12b, 34P and closes the normally open contact of the transfer set 34L. Contact LAC completes the energizing circuit between the +D.C. conductor and ground for the amplifier light LA to indicate that the amplifier output for Ties #3 and #4 is being metered. Contact 12c completes a partial energizing circuit between ground G and the +D.C. conductor for the coil of relay D, again determined by the position of the manually operated switch 41, for properly metering the total power of Ties #3 and #4, contacts 12a and 12b, ground conductors CM2 and CM3 to prevent attempts at improper cost metering in the event switches S2 or S3 are actuated. Contacts 34P connect the electrical quantity tapped from the manually set total tie power potentiometer $FP_{3,4}$ to the power metering conductor PMC and thence to the power metering servo amplifier PA, while the now closed contact of the transfer set 34L connects the total cost of power losses $\lambda \Sigma PB$'s (Ties #3 and #4) for Ties #3 and #4 to the loss conductor L10. Here again, actuation of switch S1 establishes the proper circuits for the cost metering servo to indicate the worth of the total tie power.

Operation of relay 20 establishes circuits for determining the incremental power production cost and the power of the low pressure steam-electric generating unit represented in servo section ULS. Closure of switches $2_L$ and $0_R$ energize relay 20 across conductors R2 and P0, closing contacts LLC, 20a, 20b, LPC, LP and the normally open contacts of the transfer set 20c. Contacts LLC connect the light LL, located at the location of the unit L servo, to +D.C. and ground G to indicate which servo is being metered; contacts 20a and 20b ground conductors CM1 and PC. Grounding of conductor CM1 is effective to complete an energizing circuit for the light LT adjacent the cost metering switches in the event switch S1 should be closed, which indicates an attempt at improper cost metering with respect to a station. Grounding of conductor PC again establishes a circuit to ground for relay D, which, in this case, is required to reverse the phase connections of the fixed field of the power metering servo and the power metering potentiometer, since the power quantities derived from the power potentiometer $PP_L$ for the station are, in this case, negative. Contacts LPC connect the station incremental production cost quantity $$\frac{dF_L}{dP_L}$$

to the conductor DF. Contacts LP connect the power quantity $-P_L$ taken from the power potentiometer $PP_L$ to the power metering conductor PMC. Thus, a negative power quantity from servo unit L is applied to the input of the power metering servo amplifier PA. Contacts 20c connect the quantity, $\lambda\Sigma PB$'s (Station #5), representing the cost of power losses, to loss conductor L10. This quantity flows through the normally closed contacts of the transfer set 5L of relay 22 and the normally closed contacts of the transfer set 21c of relay 21.

For power metering, switch 41 is closed, which energizes relay D, which properly phases the fixed field FPM and the power metering potentiometer $PP_M$ to obtain proper operation of the power metering servo. The low pressure unit generation is, therefore, indicated on power metering dial PMB.

To meter station production cost, switch S3 is closed, completing a circuit between conductors CM3 and T1 and completing a second circuit between conductors T0 and CC. Since conductor CM3 is ungrounded, at this time, light LT remains deenergized. Since conductor T0 is connected to +D.C. through the normally closed contacts of the transfer set BRC, a circuit is completed to ground for energizing the coil of relay C, the contact C1 of which closes, applying the incremental production cost quantity for the low pressure unit to the input of the cost metering servo amplifier. Since this is an instantaneously positive quantity, relay E remains deenergized and the connections for the cost metering servo fixed field and power potentiometer are established through the normally closed contacts FCC and E1, respectively. Thus, the cost metering servo generates a feedback quantity at the tap of potentiometer $CP_M$, which nulls the servo, indicating on dial CMD the incremental production cost for the station, that is, the cost of power at the station bus.

The cost of delivered power is obtained by opening switch S3 and closing switch S2. This picks up relays C and A to complete the delivered power cost metering circuits, as described in connection with Station #2.

Similar considerations apply to the unit H servo UHS, the metering of which is effected by energization of relay 21 by closing switches $2_L$ and $1_R$ to complete an energizing circuit for the coil of this relay between conductors R2 and P1. Contacts LHC of relay 21 energize light LH. Contacts 21a and 21b ground conductors CM1 and PC, respectively, to prevent faulty cost metering and to provide an energizing connection for relay D for reversing the phase of the connections for the cost metering servo for metering the negative power output quantity of the unit H servo power potentiometer $PP_H$. Contacts HPC connect the incremental production cost quantity $$\frac{dF_H}{dP_H}$$

to conductor DF, contacts HP connect the negative power quantity $-P_H$ to the power metering conductor PMC, and closure of the normally open contacts of the transfer set 21c connect the cost of power loss quantity for Station #5, derived from the "B" coefficient potentiometers, to the loss conductor L10. At this point, selective closing of switches S3 and S2 provides circuits for metering station production cost and cost of delivered power as described in connection with unit L servo ULS.

Relay 22 provides for metering the total power of Station #5. This relay is energized by closing switches $2_L$ and $2_R$, connecting the coil of relay 22 across conductors R2 and P2. Contacts L5C, when closed, energize light L5 to indicate the summing servo for Station #5 is being metered. Contacts 22a and 22b, respectively, ground conductors CM2 and CM3 to prevent improper metering of the cost of delivered power and the station production cost, since a total incremental production cost is not directly provided. Thus, only the worth of available power at the station can be metered. This is done by employing the technique for metering the worth of tie power. Contacts 5P, when closed, connect the positive power quantity $+P_5$ to the power metering conductor, while the normally open contacts of the transfer set 5L, when closed, connect the cost of power loss quantity, $\lambda\Sigma$ PB's (Station #5), derived from the "B" coefficient potentiometers, to the los conductor L10. In this case, operation of switch S1 establishes the circuits for the cost metering servo through energization of relays A and C. However, in this instance, conductor DF is not energized since the total incremental production cost for the station is not available from the servo circuits.

Figure 10:
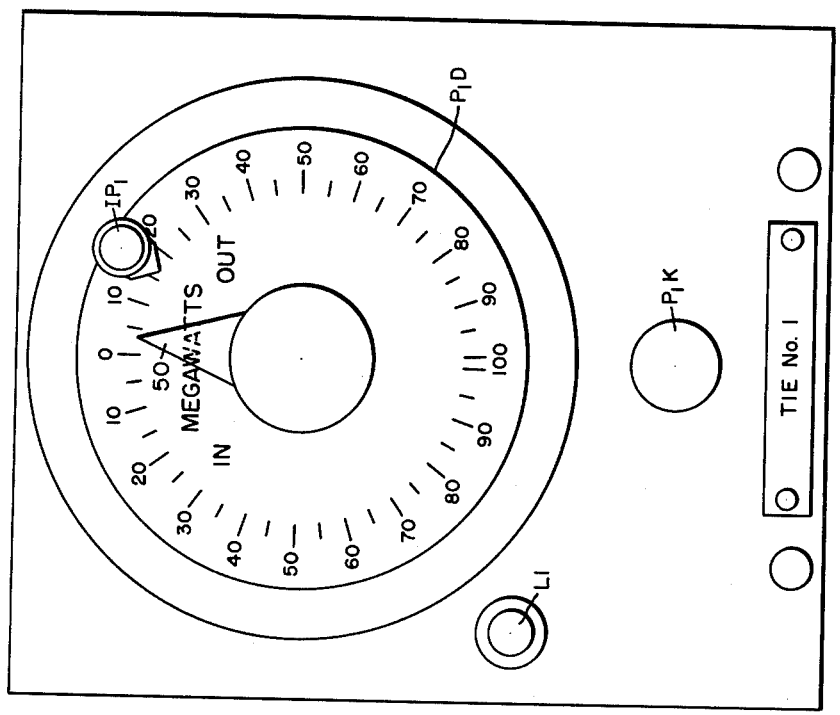

The panel arrangements for the various servo sections, including the respective power indicating dials, are shown in part in FIGS. 10 through 15. FIG. 10 shows a typical panel arrangement for a tie servo and, as such, bears reference characters corresponding to the components identified in connection with Tie #1 servo T1S, which appears in FIG. 8a. The dial is designated $P_1D$ and comprises a face calibrated in units of five megawatts. A dial pointer 50 sweeps over the calibrated scale of the dial. It will be noted that the dial has a center zero position immediately to the left of the illustrated position of the pointer, for indicating positive tie power interchange on the right and negative tie power interchange on the left, depending upon whether power is flowing into or out of the system at the tie in question. An index pointer IP is adjustable circumferentially about the edge of the dial just outside of the path swept by the end of the pointer 50 and provides a reference position indicating the value of tie power which existed previous to the new adjustment. The indicator light L1 is shown to the left and slightly below the center of the power dial and the knob $P_1K$ for adjusting the manually operated tie power potentiometer $FP_1$ is shown below the power dial. Thus, the fixed tie power is set by the operator by means of the knob $P_1K$ and the tie power is read out on the dial $P_1D$ by following the position of the servo driven pointer 50.

Figure 11:
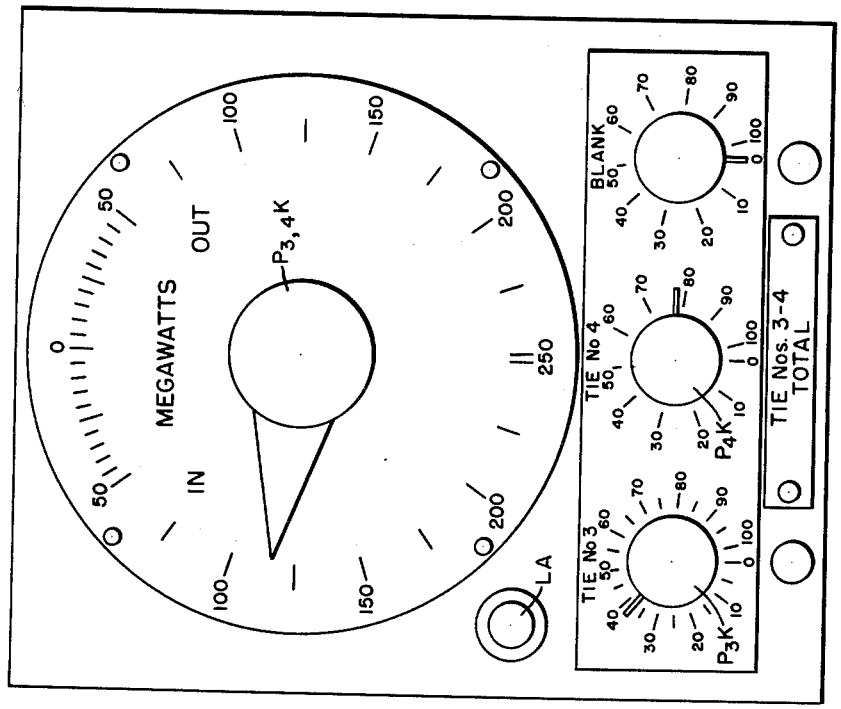

The panel arrangement for Ties #3 and #4 is represented in FIG. 11, the name plate of which reads Tie #3, 4 Total. In this arrangement, provision is made for adjusting the power settings for three different ties. However, the setting on the right is blank, since only two tie connections are used in this illustration, namely Tie #3 and Tie #4, as indicated. The total power for the tie assembly is set by means of a manually operated knob $P_{3,4}K$, which is illustrated in FIG. 8b and which controls the setting of potentiometer $FP_{3,4}$. The dial for this potentiometer which is illustrated in FIG. 11 is not shown in the schematic of FIG. 8b in the interest of simplicity. This dial, as was the case for Tie #1, has a zero center position at the top center of the dial and is calibrated in five megawatt intervals to the right and to the left of this position for indicating power interchange into or out of the system in question at the interconnection. The percentage of total tie power which is to be carried by the respective tie connections 3 and 4 is determined by the setting of respective knobs $P_3K$ and $P_4K$ controlling the settings of respective potentiometers $FP_3$ and $FP_4$ appearing in the schematic of FIG. 8b. The pointers controlled by these knobs sweep respective scales associated therewith which are calibrated in percentage of total tie power. Thus, the dispatcher manually establishes the total power interchange at Ties #3 and #4 and the individual tie powers at the respective knobs along the lower end of the panel. Each of the tie panels is further equipped with a servo operated dial arrangement, such as $P_1D$ illustrated in FIG. 10. In this case, however, since the total tie power is established at the panel of FIG. 11, the knob $P_1K$ is not used, and therefore, is left blank. However, the light L1 shown in FIG. 10 would have its counterparts L3 and L4 on the respective panels associated with the respective tie servos T3S and T4S.

Figure 12:
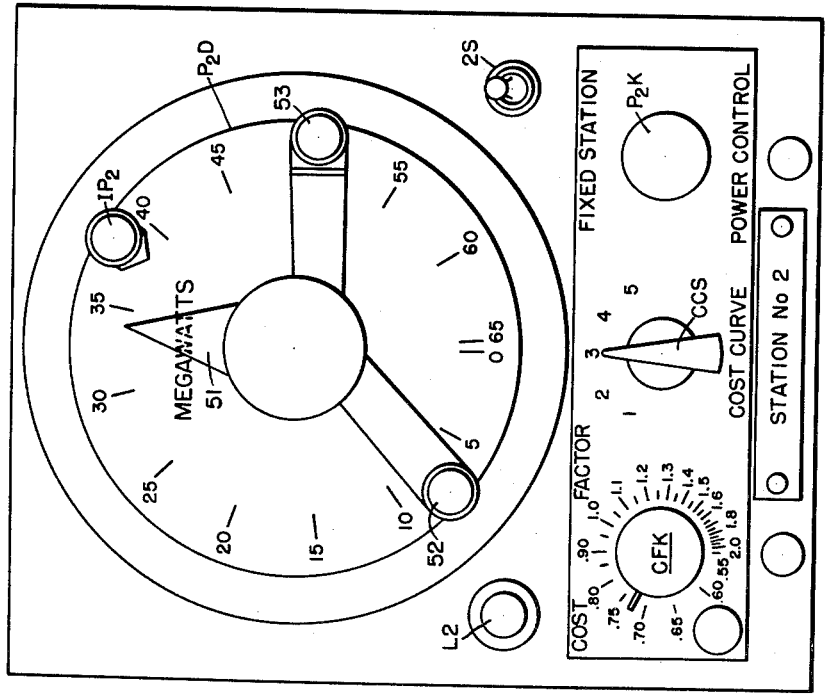

A typical station servo panel is shown in FIG. 12 and identified in connection with Station #2. This panel again comprises a dial which is swept by a pointer 51 which is driven by the station servomotor. This dial, $P_2D$, is also calibrated in terms of megawatts of power and is provided with respective lower and upper limit stops 52 and 53, which may be adjusted and locked in any particular position corresponding to the lower and upper generation limits for the station. The servos are so designed that whenever the pointer 51 engages either mechanical stop 52 or 53, movement of the servomotor is physically prevented. The servomotors are designed to remain in this locked rotor condition without damage. In computing the Economic Dispatch of the system, if a station arrives at either its upper or lower limit, as determined by the setting of the limit stops, the servo ceases to operate, and consequently, that station remains at a fixed limit and ceases to generate incrementally, as required for the Economic Dispatch. Thus, the coordination equation for this station drops out of the Economic Dispatch and the power setting for that station remains fixed. The index pointer $IP_2$, which corresponds to the index pointer $IP_1$ for Tie #1, is again adjustable just outside of the arc swept by the end of pointer 51 and indicates the power level of the station which existed prior to the present computation of power level. Thus, on a manual computer, it is within the discretion of the dispatcher to determine whether or not the generation of the station involved is sufficiently removed from the Economic Dispatch condition to require adjustment for the new setting. Light L2 is positioned at the lower left of the dial on the metering panel. The knob CFK, which is illustrated in the schematic of FIG. 8a, drives the taps of the cost factor rheostats CF2 to change the multiplier of the cost curve which is being used to that which is required for the present fuel cost associated with Station #2. It will be noted that the dial of the cost factor adjustment is calibrated from .55 to 2, providing a wide range of adjustments from the base case fuel cost represented by position 1 on the cost factor dial. Changes in the cost curve to accommodate changes in various combinations of units in the station is obtained by manipulations of the cost curve switch CCS, which is detailed in FIG. 9 and which provides for the selection of any one of five different relationships between station production cost and station power as required by the different possible combinations of station equipment as oulined hereinbefore in connection with FIG. 9. Switch 2S, as described in connection with Station #2 servo S2S, provides selective servo operation for either fixed or variable station conditions. In the fixed station position, which is the upper position of the switch, the servomotor is disconnected from the electrical quantities corresponding to the terms of the Economic Dispatch equations which are derived in the B coefficient circuits and derived from the station potentiometer $SP_2$ and the servo input is connected to the fixed power potentiometer $FP_2$, the setting of which is controlled by a knob $P_2K$ shown in the lower right-hand portion of the panel of FIG. 12. This provides a fixed station setting, as previously described.

Each of the unit servos ULS and UHS used to compute the Economic Dispatch of the low and high pressure units embodied in Station #5 are provided with panels corresponding to that described in connection with Station #2. Each station is provided with two cost factor potentiometers CFL and CFH and a plurality of cost curve adjustments to accommodate the different thermal efficiency characteristics associated with various combinations of the low pressure equipment and the high pressure equipment. Additionally, each is provided with the fixed station potentiometer and the fixed and variable station switches LS and HS, respectively, to cover the range of operating conditions required.

The summing servo S5S for Station #5 is also equipped with a power dial which would include the index pointer arrangement IP and the respective lower and upper limit stops, the same as indicated in FIG. 12. The panel, however, associated with this summing servo would not include the cost factor adjustment, the cost curve switching or the power control for fixed station operation, since these features are embodied in the servos ULS and UHS for the station. This servo thus operates only as a summing servo to derive the total station power requirement for Economic Dispatch.

Figure 13:
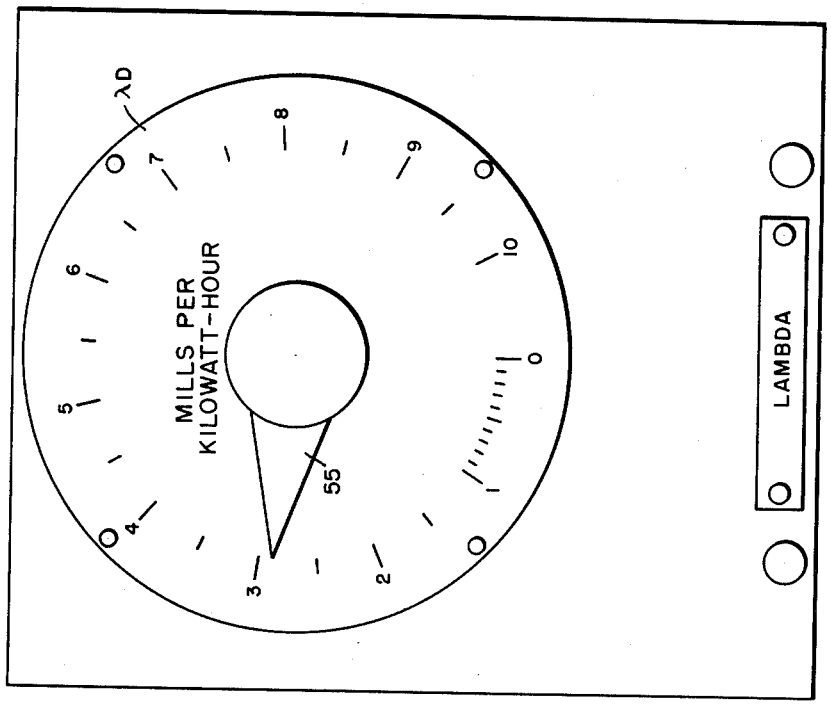

FIG. 13 illustrates the λ servo panel showing the λ dial λD and the pointer 55 which sweeps the dial and which is driven by the λ servo λS. This dial, as previously noted, may be calibrated either in terms of dollars per megawatt or mills per kilowatt hour, depending upon the requirement, and indicates the incremental delivered power cost for all stations figuring in the Economic Dispatch, that is, all variable stations.

Figure 14:
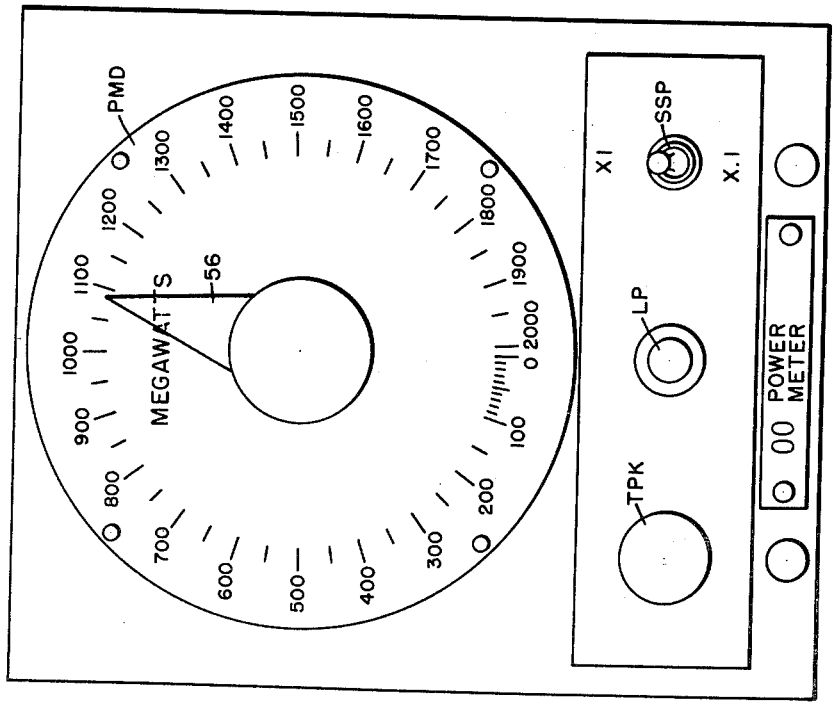

FIG. 14 illustrates the power meter panel showing the power meter dial PMD and the pointer 56 which sweeps the dial. This dial is calibrated in megawatts. The knob TPK, which adjusts the total power, is manually operated by the dispatcher, as required, and, as shown in FIG. 8d, actually drives the pointer on the λ potentiometer —λP. The dispatcher, while adjusting the knob TPK, watches the pointer 56 on dial PMD and manipulates the adjusting knob until total power is read on dial PMD, as required for the load on the system at that time. The light LP indicates that total power is being read. As will be recalled, this light is controlled by operation of the total power relay 00 illustrated in FIG. 8h and the circuit for this light is completed by contacts LPC on the total power relay whenever this relay is energized. This light is not energized whenever power readings at the respective tie points and stations are being read. A scale selector switch for the power metering servo designated SSP switches the output of the servo driven potentiometer PPM between respective resistors 57 and 58 in the input circuit to the power metering amplifier PA. This switch provides a ten to one recalibration of the circuit for metering purposes. Thus, in the lower position illustrated in FIG. 14, the low resistance resistor is connected in series in the input to the power metering amplifier PA. This resistor is one-tenth the value of the resistor 57, for example. In this position the scale is effectively expanded for accurate metering of the powers from the individual system points. In the upper position of this switch, resistance 57, which is ten times the magnitude of resistor 58, is connected in series in the input to the amplifier, which effectively compresses the scale divisions of the power metering dial, so that the total system power may be read on the scale.

Figure 15:
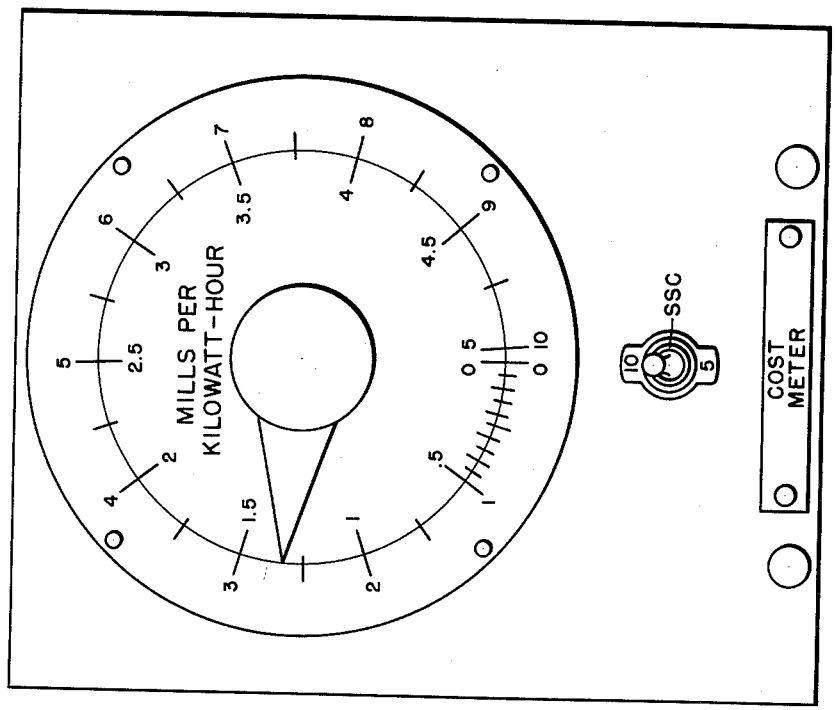

The cost metering servo panel is illustrated in FIG. 15. This dial may be calibrated either in terms of dollars per megawatt hour or mills per kilowatt hour, as illustrated in FIG. 15. A scale selector switch is provided on this dial also so that individual costs, as well as total costs of power, may be accurately read. This switch, which is designated SSC, controls respective resistors 60 and 61. Resistor 61, for example, being twice the magnitude of resistor 60, to provide a two to one range of scale recalibration.

The method of operation will be apparent from the following enumerated steps:

(1) Set the upper and lower limits on the station units by means of the adjustable stops.

(2) Adjust the power on fixed stations and ties by the computer control knobs to the values determined from system telemeters, phone calls or previously scheduled values.

(3) Set the total generation as read on the computer's power meter (dial PMD) to equal the actual system total plus net tie line input.

(4) Compare the power on each station unit on the computer with the power the actual station is carrying and issue orders to change those that are different (these will usually be those whose power pointers are not in line with their index pointers).

(5) Reset the index pointers to the new values.

(6) This process is repeated for steps 3, 4 and 5 each time the total generation changes appreciably.

Although the computer arrangements described herein are arranged for manual operation, automatic operation is simply achieved if the necessary telemetering channels exist on a particular electric power transmission system. The operation of the computer itself would then be similar to manual operation, but the input and output funcions would not require control by the dispatcher. Total generation would be set into the computer by the operation of a slide wire potentiometer in the total generation recorder, for example, a suitable servo may be provided to drive potentiometer $-\lambda P$ as a function of the total power requirement of the system as telemetered into the total power servo from the system. Similarly, the information on tie line power would be set into the computer by a servo operated potentiometer in each tie line load recorder.

To telemeter power requirements out to the variable stations on the system would require a comparison between a servo operated load recorder potentiometer for that station and the power potentiometer of the computer representative of that station. Thus, one potentiometer represents the actual generation of the station and the computer potentiometer represents the required generation. The comparison of these two voltages, therefore, is equivalent to comparing the computed and actual powers. Any suitable means for telemetering "raise" or "lower" signals to the station in question may be employed.

From the foregoing considerations, it will be appreciated that a computer has been provided which simply and effectively represents the Economic Dispatch conditions of an electric power transmission system. By using an analogue type representation, considerable simplification with respect to digital type circuitry has been achieved.

Although the alternating current type of system herein employed offers certain advantages due to the general availability of alternating current, it will be appreciated that the system may be mechanized with equal facility using direct current and employing potentiometers to generate the $\lambda$ function, for example. With direct current energization either direct current or alternating current servos may be employed in accordance with conventional engineering techniques. This expedient involves no departures in the teachings herein presented in regard to the inventive aspects.

Although servo types of analogue circuits have been herein illustrated, and while these seemingly represent a simplified type of analogue circuitry for effectively representing system Economic Dispatch, it will be appreciated that static types of analogue circuits may also be employed to achieve the results herein illustrated. In connection with the use of static circuitry, the generator unit characteristics or station characteristics, as may be required, can be conveniently simulated electrically by a type of static non-linear impedance or resistance as covered in applicant's Patent 2,697,201, entitled Adjustable Non-Linear Resistance, and assigned to the assignee of this invention. This circuit may be used in conjunction with a high gain amplifier, being connected as the input circuit, the non-linear output controlling the input to the amplifier to obtain an amplifier output voltage indicative of required power in dependence of input to the non-linear resistance as a function of heat rate, production cost or other quantity having the non-linearity as a function of power, all of which are derivable from rearrangement of the terms and quantities of the economic dispatch equation.

It will be noted that the various objects stated hereinbefore have been accomplished in the circuit arrangements herein provided, with particular reference to the circuit illustrated in FIGS. 8a through 8h, wherein provision is made for metering the power at any power point in the system, for metering the total power of the system, for metering the cost of delivered power, for metering station production cost and for metering the worth of available power at any power point, that is, station or tie.

Although several embodiments of this invention have been disclosed herein, it will be appreciated by those skilled in the art that various modifications in the details of the components herein disclosed, together with the organization of those components, may be made without departing from the spirit and scope of the invention. Accordingly, it is intended that the foregoing disclosure and the showings made in the drawings shall be considered only as illustrative of the principles of this invention and not construed in a limiting sense.

I claim as my invention:

1. A computer for determining the economic power dispatch for at least two variable generating stations of an electric power transmission system comprising, a power production cost circuit for each station for producing respective power cost quantities, loss coefficient circuits comprising circuits for simulating self impedances and mutual impedances for each station and each pair of stations, respectively; means for producing a quantity indicative of delivered power cost for application to said loss simulating circuits, respective station power circuit means for producing a power quantity for controlling said power production cost circuit and for controlling the loss simulating circuits associated with the respective stations to produce respective quantities indicative of the cost of power losses, and means for applying the associated power cost quantity and the associated cost of power lost quantities to said respective station power circuit means for controlling said respective power quantities.

2. A computer for determining the economic power dispatch for at least two variable generating stations of an electric power transmission system comprising, a power production cost circuit for each station for producing respective power cost quantities, power loss cirutis for producing an output quantity indicative of the cost of power lost, means for producing a quantity indicative of delivered power cost for application to said power loss circuits, means for producing a power quantity for application to said power production cost circuit and to said power loss circuits, and means responsive to said power cost quantity and said cost of power lost quantity for controlling said means for producing said power quantity.

3. A computer for determining the economic power dispatch for at least two variable generating stations of an electric power transmission system comprising, a station power production cost circuit for each station for producing respective station power production cost quantities, transmission loss circuits, means for producing an average power cost quantity for the transmission system and applying said average power cost quantity to said transmission loss circuits, station power means for each station for producing respective station power quantities, means applying said respective station power quantities to said respective station power production cost circuits and to said transmission loss circuits to control the outputs of all said circuits, and means applying the algebraic sum of said respective station power production cost quantities and the output of said transmission loss circuits to said respective station power means to control said respective station power means.

4. In a computer for computing the economic dispatch of power for each station of a group of variable stations in an electric power transmission system, the combination of, a computer section for each station, each computer section comprising a station power production cost circuit producing a power production cost quantity for that station, a transmission loss circuit for each station, each producing a loss coefficient quantity, and means producing a power quantity; means producing an average power cost quantity for the transmission system, means supplying said power quantity of each computer section to each other computer section, means in each computer section multiplying said average power cost quantity with each of the corresponding power and loss coefficient quantities to produce product quantities, and means in each computer section responsive to the sum of said product quantities and said power production cost quantity for controlling said means producing said power quantity.

5. In a computer for computing the economic dispatch of power for each station of a group of variable stations in an electric power transmission system, the combination of, a computer section for each station, each computer section comprising a station power production cost circuit producing a power production cost quantity for that station, a transmission loss circuit for each station, each producing a loss coefficient quantity, and means producing a power quantity; means producing an average power cost quantity for the transmission system, means supplying said power quantity of each computer section to each other computer section, means in each computer section multiplying said average power cost quantity with each of the corresponding power and loss coefficient quantities to produce product quantities, means in each computer section responsive to the sum of said product quantities and said power production cost quantity for controlling said means producing said power quantity, summing means for summing the responsive power quantities, and means responsive to the sum of said power quantities for producing a total power quantity.

6. In a computer for computing the economic dispatch of power for each station of a group of variable stations of an electric power transmission system, the combination of, a computer section for each variable station, each computer section producing a power quantity representative of power required of the station represented thereby, circuit means for each station for producing respective transmission power loss quantities for the respective stations from which, in part, the power requirement of the respective stations is computed by the respective computer sections, each of said circuit means comprising a loss coefficient circuit for each system station and tie, means controlling said respective loss coefficient circuits in dependence of the corresponding power quantity, and means for summing the outputs of the respective loss coefficient circuits at each computer section and utilizing the respective summed outputs in producing said respective power quantities.

7. In a computer for computing the economic dispatch of power for each station of a group of variable stations of an electric power transmission system, the combination of, a computer section for each variable station, each computer section producing a power quantity representative of power required of the station represented thereby, circuit means for each station for producing respective transmission power loss quantities for the respective stations from which, in part, the power requirement of the respective stations is computed by the respective computer sections, each of said circuit means comprising a loss coefficient circuit for each system station and tie, means controlling said respective loss coefficient circuits in dependence of the corresponding power quantity, means for summing the outputs of the respective loss coefficient circuits at each computer section and utilizing the respective summed outputs in producing said respective power quantities, means producing a quantity indicative of the incremental cost of delivered power, and multiplying means combining said respective power loss quantities as products with said incremental cost of delivered power quantity.

8. An economic dispatch computer for computing the economic dispatch of power for each station of a group of variable stations of an electric power transmission system comprising, respective computer sections, each including a non-linear impedance circuit for producing an electrical quantity indicative of the incremental power production cost for that station, a pair of linear impedance circuits, power quantity circuit means producing a power quantity controlling said linear and non-linear impedance circuits, and respective loss coefficient circuits for each generating unit and tie in the system; circuit means for producing a pair of incremental cost of delivered power quantities of opposite sense, means applying said respective incremental cost of delivered power quantities to said respective linear impedance circuits, circuit means applying the outputs of said linear impedance circuits of each computer section to the corresponding loss coefficient circuits of each computer section, means in each computer section summing the outputs of the loss coefficient circuits associated therewith, and means combining the respective summed outputs of the loss coefficient circuits with the output of the corresponding non-linear circuit to control said power quantity circuit.

9. An economic dispatch computer for computing the economic dispatch of power for each station of a group of variable stations of an electric power transmission system comprising, a plurality of computer sections, one for each variable station, producing power quantities in dependence of station thermal efficiencies and fuel costs indicative of the power to be generated by the variable station represented thereby, means producing respective power quantities indicative of the respective tie powers and the respective fixed station powers, respective loss coefficient circuits for each computer section, each including a loss coefficient member for each of said power quantities and each loss coefficient member being controlled by the associated power quantity, and means for summing the outputs of the members of the respective loss coefficient circuits and applying the respective summed outputs to the respective computer sections to control the respective computer sections.

10. An economic dispatch computer for computing the economic dispatch of power for each station of a group of variable stations of an electric power transmission system comprising, a plurality of computer sections, one for each variable station, producing power quantities in dependence of station thermal efficiencies and fuel costs indicative of the power to be generated by the variable station represented thereby, means producing respective power quantities indicative of the respective tie powers and the respective fixed station powers, respective loss coefficient circuits for each computer section, each including a loss coefficient member for each of said power quantities and each loss coefficient member being controlled by the associated power quantity, means for summing the outputs of the members of the respective loss coefficient circuits and applying the respective summed outputs to the respective computer sections to control the respective computer sections, means producing additional respective power quantities in dependence of said respective first named power quantities, and circuit means summing said addtiional respective power quantities for indicating the total power of said system.

11. An economic dispatch computer for computing the economic dispatch of power for each variable station of a power transmission system comprising, a computer section for each station, each computer section having, a non-linear station potentiometer defining the non-linear thermal efficiency characteristic of the station and having an adjustable tap, linear potentiometer means having an adjustable tap, an electrically controlled servo connected to drive said taps, and a loss coefficient circuit including a loss coefficient impedance for each station; means in each computer section for applying a substantially constant electrical quantity to each non-linear potentiometer, means producing a variable electrical quantity indicative of the incremental delivered cost of power for said system, circuit means applying said incremental cost of delivered power quantity to each linear potentiometer means, circuit means connecting the tap of each linear potentiometer to the corresponding loss coefficient members of said respective loss coefficient circuits, and circuits connecting the corresponding non-linear potentiometer taps and loss coefficient circuits to the respective servos to control said servos, and means operated by said respective servos for indicating the power requirement of the respective stations.

12. An economic dispatch computer for computing the economic dispatch of power for each variable station of a power transmission system comprising, a computer section for each station, each computer section having, a non-linear station potentiometer defining the non-linear thermal efficiency characteristic of the station and having an adjustable tap, linear potentiometer means having an adjustable tap, an electrically controlled servo connected to drive said taps, and a loss coefficient circuit including a loss coefficient impedance for each station; means in each computer section for applying a substantially constant electrical quantity to each non-linear potentiometer, means producing a variable electrical quantity indicative of the incremental delivered cost of power for said system, circuit means applying said incremental cost of delivered power quantity to each linear potentiometer means, circuit means connecting the tap of each linear potentiometer to the corresponding loss coefficient members of said respective loss coefficient circuits, circuits connecting the corresponding non-linear potentiometer taps and loss coefficient circuits to the respective servos to control said servos, and calibrated scale means for each servo connected to and operated by the respective servos for indicating the power requirement of the respective stations.

13. An economic dispatch computer for computing the economic dispatch of power for each variable station of a power transmission system comprising, a computer section for each station, each computer section having, a non-linear station potentiometer defining the non-linear thermal efficiency characteristic of the station and having an adjustable tap, linear potentiometer means having an adjustable tap, an electrically controlled servo connected to drive said taps, and a loss coefficient circuit including a loss coefficient impedance for each station; means in each computer section for applying a substantially constant electrical quantity to each non-linear potentiometer, means producing a variable electrical quantity indicative of the incremental delivered cost of power for said system, circuit means applying said incremental cost of delivered power quantity to each linear potentiometer means, circuit means connecting the tap of each linear potentiometer to the corresponding loss coefficient members of said respective loss coefficient circuits, circuits connecting the corresponding non-linear potentiometer taps and loss coefficient circuits to the respective servos to control said servos, separate power potentiometers for each servo, each having a tap connected to and operated by the respective servos, and circuits means connected with said taps for summing the electrical quantities at said taps for indicating total power.

14. Apparatus as set forth in claim 13 wherein said last named circuit means includes an electrically operated servo responsive the sum of said electrical quantities and having a calibrated scale operated by said servo to indicate total power.

15. An economic dispatch computer for computing the economic dispatch of power for each variable station of a power transmission system comprising, a computer section for each station, each computer section having, a non-linear station potentiometer defining the non-linear thermal efficiency characteristic of the station and having an adjustable tap, linear potentiometer means having an adjustable tap, an electrically controlled servo connected to drive said taps, a limit stop on said servo arranged to stop operation thereof at a point corresponding to a power limit for the associated station, and a loss coefficient circuit including a loss coefficient impedance for each station; means in each computer section for applying a substantially constant electrical quantity to each non-linear potentiometer, means producing a variable electrical quantity indicative of the incremental delivered cost of power for said system, circuit means applying said incremental cost of delivered power quantity to each linear potentiometer means, circuit means connecting the tap of each linear potentiometer to the corresponding loss coefficient members of said respective loss coefficient circuits, circuits connecting the corresponding non-linear potentiometer taps and loss coefficient circuits to the respective servos to control said servos, and means operated by said respective servos for indicating the power requirement of the respective stations.

16. An economic dispatch computer for computing the economic dispatch of power for each variable station of a power transmission system comprising, a computer section for each station, each computer section having, a non-linear station potentiometer defining the non-linear thermal efficiency characteristic of the station and having an adjustable tap, linear potentiometer means having an adjustable tap, an electrically controlled servo connected to drive said taps, upper and lower power limit stops on said servo arranged to stop operation thereof at points corresponding to upper and lower power limits for the associated station, and a loss coefficient circuit including a loss coefficient impedance for each station; means in each computer section for applying a substantially constant electrical quantity to each non-linear potentiometer, means producing a variable electrical quantity indicative of the incremental delivered cost of power for said system, circuit means applying said incremental cost of delivered power quantity to each linear potentiometer means, circuit means connecting the tap of each linear potentiometer to the corresponding loss coefficient members of said respective loss coefficient circuits, circuits connecting the corresponding non-linear potentiometer taps and loss coefficient circuits to the respective servos to control said servos, and means operated by said respective servos for indicating the power requirement of the respective stations.

17. An economic dispatch computer for computing the economic dispatch of power for each variable station of a power transmission system comprising, a computer section for each station, each computer section having, a non-linear station potentiometer defining the non-linear thermal efficiency characteristic of the station and having an adjustable tap, linear potentiometer means having an adjustable tap, an electrically controlled servo connected to drive said taps, and a loss coefficient circuit including a loss coefficient impedance for each station; means in each computer section for applying a substantially constant electrical quantity to each non-linear potentiometer, means producing a variable electrical quantity indicative of the incremental delivered cost of power for said system, circuit means applying said incremental cost of delivered power quantity to each linear potentiometer means, circuit means connecting the tap of each linear potentiometer to the corresponding loss coefficient members of said respective loss coefficient circuits, circuits connecting the corresponding non-linear potentiometer taps and loss coefficient circuits to the respective servos to control said servos, calibrated scale means for each servo connected to and operated by the respective servos for indicating the power requirement of the respective stations, each scale means having a stationary member and a movable member, said movable member being connected to said servo to be driven thereby, and at least one limit stop on one of said members arranged to stop relative movement between said members in a given direction and arranged to stop said servo.

18. An economic dispatch computer for computing the economic power dispatch of a plurality of generating stations of an electric power transmission system comprising, a computer section for each variable station for producing a power quantity indicative of the economic dispatch power for the associated station, each computer section including a loss coefficient circuit comprising respective impedance members for each station, circuit means applying said respective power quantities to corresponding impedance members of said respective loss coefficient circuits, and means applying the outputs of the respective loss coefficient circuits to the corresponding computer sections.

19. A circuit for computing the power loss for a station of an electric power transmission system comprising, a loss coefficient circuit having an impedance member for each of a plurality of stations, means producing respective power quantities indicative of power at each station, means applying said respective power quantities to the corresponding impedance members in each of said plurality of stations, and circuit means connecting selected points of said impedance members in parallel to sum the currents therefrom producing a total current indicative of power loss for said station.

20. In a computer for determining the worth of available power at a tie in an electric power transmission system, the combination of, a computer section for each power point in the system including said tie, each producing a power quantity indicative of the power at the corresponding power point, a loss coefficient circuit for said tie comprising respective impedance members for each power point in the system, circuit means producing an electrical quantity indicative of incremental cost of delivered power, means in each computer section forming a product of said incremental cost of delivered power quantity and the corresponding power quantity producing respective product quantities, means applying said product quantities to the corresponding impedance members of said loss coefficient circuit to produce a loss output, and means differentially relating the output quantity of said loss coefficient circuit and said incremental cost of delivered power quantity to obtain a quantity indicative of the worth of power at said tie.

References Cited in the file of this patent
UNITED STATES PATENTS

| | | |
|---|---|---|
| 2,301,470 | Star | Nov. 10, 1942 |
| 2,437,591 | Briskin et al. | Mar. 9, 1948 |
| 2,476,747 | Lovell | July 19, 1949 |
| 2,511,924 | Lee | June 20, 1950 |
| 2,561,140 | Schaefer | July 17, 1951 |
| 2,650,760 | Bills | Sept. 1, 1953 |
| 2,698,134 | Agins | Dec. 28, 1954 |
| 2,714,309 | Redemske | Aug. 2, 1955 |
| 2,836,730 | Early | May 27, 1958 |

OTHER REFERENCES

Electronic Analog Computers (Korn and Korn), page 244, pub. by McGraw-Hill; 1952. (Copy in Scientific Library.)